(12) United States Patent
Janssen et al.

(10) Patent No.: US 7,673,516 B2
(45) Date of Patent: Mar. 9, 2010

(54) ULTRASONIC LIQUID TREATMENT SYSTEM

(75) Inventors: Robert Allen Janssen, Alpharetta, GA (US); Thomas David Ehlert, Neenah, WI (US); John Gavin MacDonald, Decatur, GA (US); Earl C. McCraw, Jr., Duluth, GA (US); Patrick Sean McNichols, Hortonville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 362 days.

(21) Appl. No.: 11/617,515

(22) Filed: Dec. 28, 2006

(65) Prior Publication Data
US 2008/0156737 A1  Jul. 3, 2008

(51) Int. Cl.
*G01H 3/00*  (2006.01)
*B01D 17/04*  (2006.01)
*B01F 11/00*  (2006.01)

(52) U.S. Cl. .................. 73/592; 73/61.43; 210/708; 366/124

(58) Field of Classification Search .................. 73/592, 73/61.43, 61.44, 426, 865.5; 210/708, 738, 210/748; 239/102.2, 585.4; 366/127
See application file for complete search history.

(56) References Cited

U.S. PATENT DOCUMENTS

| | | |
|---|---|---|
| 2,307,206 A | 1/1943 | Fischer |
| 2,584,053 A | 1/1952 | Seavey et al. |
| 2,946,981 A | 7/1960 | O'Neill |
| 3,202,281 A | 8/1965 | Weston |
| 3,246,881 A | 4/1966 | Davidson et al. |
| 3,249,453 A | 5/1966 | Schnoring et al. |
| 3,273,631 A | 9/1966 | Neuman |
| 3,275,787 A | 9/1966 | Newberry |
| 3,325,348 A | 6/1967 | Bennett |
| 3,326,470 A | 6/1967 | Loudin et al. |
| 3,338,992 A | 8/1967 | Kinney |
| 3,341,394 A | 9/1967 | Kinney |
| 3,479,873 A | 11/1969 | Hermanns |
| 3,490,584 A | 1/1970 | Balamuth |
| 3,502,763 A | 3/1970 | Hartman |

(Continued)

FOREIGN PATENT DOCUMENTS

CA  2175065  5/1995

(Continued)

OTHER PUBLICATIONS

Non-final office action regarding U.S. Appl. No. 11/530,311, dated Nov. 5, 2008.

(Continued)

*Primary Examiner*—J M Saint Surin
(74) *Attorney, Agent, or Firm*—Armstrong Teasdale, LLP

(57) ABSTRACT

An ultrasonic treatment chamber and a process for ultrasonically treating a liquid in an ultrasonic treatment chamber include an elongate, generally tubular housing having an inlet and an outlet spaced longitudinally from the inlet. Liquid is directed into the housing at the housing inlet for longitudinal flow within the housing to the housing outlet. Mechanical ultrasonic vibration is generated within the housing in direct contact with the liquid flowing within the housing, with the direct contact being upstream of the housing outlet. A standing acoustic wave is produced within the housing with the standing acoustic wave having a node spaced longitudinally from the housing outlet.

24 Claims, 7 Drawing Sheets

U.S. PATENT DOCUMENTS

| | | | |
|---|---|---|---|
| 3,519,251 A | 7/1970 | Hammitt et al. | |
| 3,542,345 A | 11/1970 | Kuris | |
| 3,542,615 A | 11/1970 | Dobo et al. | |
| 3,567,185 A | 3/1971 | Ross et al. | |
| 3,664,191 A | 5/1972 | Hermanns | |
| 3,692,618 A | 9/1972 | Dorschner et al. | |
| 3,782,547 A | 1/1974 | Dietert | |
| 3,802,817 A | 4/1974 | Matsuki et al. | |
| 3,865,350 A | 2/1975 | Burtis | |
| 4,062,768 A | 12/1977 | Elliot | |
| 4,168,295 A | 9/1979 | Sawyer | |
| 4,218,221 A | 8/1980 | Cottell | |
| 4,259,021 A | 3/1981 | Goudy et al. | |
| 4,266,879 A | 5/1981 | McFall | |
| 4,340,563 A | 7/1982 | Appel et al. | |
| 4,372,296 A | 2/1983 | Fahim | |
| 4,511,254 A | 4/1985 | North et al. | |
| 4,556,467 A | 12/1985 | Kuhn | |
| 4,663,220 A | 5/1987 | Wisneski et al. | |
| 4,673,512 A | 6/1987 | Schram | |
| 4,693,879 A | 9/1987 | Yoshimura et al. | |
| 4,706,509 A | 11/1987 | Riebel | |
| 4,708,878 A | 11/1987 | Hagelauer et al. | |
| 4,726,522 A | 2/1988 | Kokubo et al. | |
| 4,743,361 A | 5/1988 | Schram | |
| 4,848,159 A | 7/1989 | Kennedy et al. | |
| 4,877,516 A | 10/1989 | Schram | |
| 4,879,011 A | 11/1989 | Schram | |
| 4,929,279 A | 5/1990 | Hays | |
| RE33,524 E | 1/1991 | Schram | |
| 4,983,045 A | 1/1991 | Taniguchi | |
| 5,006,266 A | 4/1991 | Schram | |
| 5,026,167 A | 6/1991 | Berliner, III | |
| 5,032,027 A | 7/1991 | Berliner, III | |
| 5,059,249 A | 10/1991 | Hays | |
| 5,164,094 A | 11/1992 | Stuckart | |
| 5,169,067 A | 12/1992 | Matsuka et al. | |
| 5,242,557 A | 9/1993 | Jones et al. | |
| 5,258,413 A | 11/1993 | Isayev | |
| 5,326,164 A | 7/1994 | Logan | |
| 5,330,100 A | 7/1994 | Malinowski | |
| 5,335,449 A | 8/1994 | Beatty | |
| 5,391,000 A | 2/1995 | Taniguchi | |
| 5,466,722 A | 11/1995 | Stoffer et al. | |
| 5,536,921 A | 7/1996 | Hedrick et al. | |
| 5,583,292 A | 12/1996 | Karbach et al. | |
| 5,585,565 A | 12/1996 | Glascock et al. | |
| 5,665,383 A | 9/1997 | Grinstaff et al. | |
| 5,681,457 A | 10/1997 | Mahoney | |
| 5,711,888 A | 1/1998 | Trampler et al. | |
| 5,803,270 A | 9/1998 | Brodeur | |
| 5,831,166 A | 11/1998 | Kozuka et al. | |
| 5,868,153 A | 2/1999 | Cohen et al. | |
| 5,873,968 A | 2/1999 | Pike et al. | |
| 5,902,489 A | 5/1999 | Yasuda et al. | |
| 5,916,203 A | 6/1999 | Brandon et al. | |
| 5,922,355 A | 7/1999 | Parikh et al. | |
| 5,935,883 A | 8/1999 | Pike | |
| 5,964,926 A | 10/1999 | Cohen | |
| 5,979,664 A | 11/1999 | Brodeur | |
| 6,010,592 A | 1/2000 | Jameson et al. | |
| 6,020,277 A | 2/2000 | Jameson | |
| 6,053,424 A | 4/2000 | Gipson et al. | |
| 6,055,859 A | 5/2000 | Kozuka et al. | |
| 6,060,416 A | 5/2000 | Kobata | |
| 6,074,466 A | 6/2000 | Iwasa | |
| 6,090,731 A | 7/2000 | Pike et al. | |
| 6,169,045 B1 | 1/2001 | Pike et al. | |
| 6,218,483 B1 | 4/2001 | Muthiah et al. | |
| 6,221,258 B1 | 4/2001 | Feke et al. | |
| 6,254,787 B1 | 7/2001 | Kimura et al. | |
| 6,266,836 B1 | 7/2001 | Gallego Juarez et al. | |
| 6,315,215 B1 | 11/2001 | Gipson et al. | |
| 6,332,541 B1 | 12/2001 | Coakley et al. | |
| 6,361,697 B1 | 3/2002 | Coury et al. | |
| 6,380,264 B1 | 4/2002 | Jameson et al. | |
| 6,383,301 B1 | 5/2002 | Bell et al. | |
| 6,450,417 B1 | 9/2002 | Gipson et al. | |
| 6,467,350 B1 | 10/2002 | Kaduchak et al. | |
| 6,482,327 B1 | 11/2002 | Mori et al. | |
| 6,506,584 B1 | 1/2003 | Chandler et al. | |
| 6,547,935 B2 * | 4/2003 | Scott | 204/157.15 |
| 6,547,951 B1 | 4/2003 | Maekawa | |
| 6,551,607 B1 | 4/2003 | Minerath, III | |
| 6,593,436 B2 | 7/2003 | Austin et al. | |
| 6,624,100 B1 | 9/2003 | Pike et al. | |
| 6,627,265 B2 | 9/2003 | Kutilek | |
| 6,655,826 B1 | 12/2003 | Leanos | |
| 6,659,365 B2 | 12/2003 | Gipson et al. | |
| 6,676,003 B2 | 1/2004 | Ehlert et al. | |
| 6,689,730 B2 | 2/2004 | Hortel et al. | |
| 6,739,524 B2 | 5/2004 | Taylor-McCune et al. | |
| 6,770,600 B1 | 8/2004 | Lamola | |
| 6,817,541 B2 | 11/2004 | Sands et al. | |
| 6,818,128 B2 * | 11/2004 | Minter | 210/205 |
| 6,858,181 B2 | 2/2005 | Aoyagi | |
| 6,878,288 B2 * | 4/2005 | Scott | 210/748 |
| 6,883,724 B2 | 4/2005 | Adiga et al. | |
| 6,890,593 B2 | 5/2005 | Tian | |
| 6,897,628 B2 | 5/2005 | Gunnerman | |
| 6,902,650 B2 | 6/2005 | Park et al. | |
| 6,911,153 B2 * | 6/2005 | Minter | 210/748 |
| 6,929,750 B2 | 8/2005 | Laurell et al. | |
| 6,935,770 B2 | 8/2005 | Schueler | |
| 6,936,151 B1 | 8/2005 | Lock | |
| 7,083,764 B2 * | 8/2006 | Scott | 422/186 |
| 7,108,137 B2 * | 9/2006 | Lal et al. | 209/659 |
| 7,150,779 B2 * | 12/2006 | Meegan, Jr. | 95/29 |
| 7,156,201 B2 | 1/2007 | Peshkovskiy et al. | |
| 7,322,431 B2 * | 1/2008 | Ratcliff | 175/206 |
| 7,424,883 B2 | 9/2008 | McNichols et al. | |
| 7,516,664 B2 | 4/2009 | Meier et al. | |
| 2001/0040935 A1 | 11/2001 | Case | |
| 2002/0164274 A1 | 11/2002 | Haggett et al. | |
| 2003/0048692 A1 | 3/2003 | Cohen et al. | |
| 2003/0066899 A1 | 4/2003 | Gipson | |
| 2003/0143110 A1 | 7/2003 | Kritzler | |
| 2004/0022695 A1 | 2/2004 | Simon et al. | |
| 2004/0065599 A1 | 4/2004 | Lal et al. | |
| 2004/0120904 A1 | 6/2004 | Lye et al. | |
| 2004/0142041 A1 | 7/2004 | MacDonald et al. | |
| 2004/0187524 A1 | 9/2004 | Sen et al. | |
| 2005/0000914 A1 | 1/2005 | Dahlberg et al. | |
| 2005/0008560 A1 | 1/2005 | Kataoka et al. | |
| 2005/0025797 A1 | 2/2005 | Xingwu | |
| 2005/0082234 A1 | 4/2005 | Solenthaler | |
| 2005/0084438 A1 | 4/2005 | Do et al. | |
| 2005/0084464 A1 | 4/2005 | McGrath et al. | |
| 2005/0129161 A1 | 6/2005 | Laberge | |
| 2005/0207431 A1 | 9/2005 | Beca et al. | |
| 2005/0235740 A1 | 10/2005 | Desie et al. | |
| 2005/0260106 A1 | 11/2005 | Marhasin | |
| 2006/0000034 A1 | 1/2006 | McGrath | |
| 2006/0008442 A1 | 1/2006 | MacDonald et al. | |
| 2006/0120212 A1 | 6/2006 | Taniguchi et al. | |
| 2007/0114306 A1 | 5/2007 | Kawakami et al. | |
| 2007/0170277 A1 | 7/2007 | Ehlert | |
| 2008/0061000 A1 | 3/2008 | Janssen | |
| 2008/0062811 A1 | 3/2008 | Janssen et al. | |
| 2008/0063718 A1 | 3/2008 | Janssen et al. | |
| 2008/0069887 A1 | 3/2008 | Baran et al. | |
| 2008/0155763 A1 | 7/2008 | Janssen et al. | |
| 2008/0192568 A1 | 8/2008 | Hielscher et al. | |

| | | | |
|---|---|---|---|
| 2008/8251375 | 10/2008 | Hielscher et al. | |

FOREIGN PATENT DOCUMENTS

| | | | |
|---|---|---|---|
| CH | 657067 | | 8/1986 |
| CN | 1247628 | | 3/2006 |
| CN | 101153138 | | 4/2008 |
| DE | 262553 | A3 | 12/1988 |
| DE | 9017338 | | 3/1991 |
| DE | 4444525 | | 6/1996 |
| DE | 19854013 | | 5/2000 |
| DE | 19913397 | | 9/2000 |
| DE | 19938254 | | 2/2001 |
| DE | 29825063 | | 6/2004 |
| DE | 102004040233 | | 3/2006 |
| DE | 102005025118 | | 1/2007 |
| DE | 102005034629 | | 1/2007 |
| EP | 0269941 | A1 | 6/1988 |
| EP | 0292470 | | 11/1988 |
| EP | 347891 | | 12/1989 |
| EP | 0459967 | A2 | 12/1991 |
| EP | 625482 | | 11/1994 |
| EP | 0648531 | | 4/1995 |
| EP | 648531 | | 4/1995 |
| EP | 1954388 | | 3/2007 |
| EP | 0983968 | | 3/2008 |
| FR | 2793811 | | 11/2000 |
| FR | 2799811 | * | 11/2000 |
| GB | 1404575 | A | 9/1975 |
| JP | 56028221 | A | 3/1981 |
| JP | 57119853 | A | 7/1982 |
| JP | 58034051 | A | 2/1983 |
| JP | 62039839 | U | 3/1987 |
| JP | 63072364 | A | 4/1988 |
| JP | 63104664 | A | 5/1988 |
| JP | 1108081 | A | 4/1989 |
| JP | 2025602 | A | 1/1990 |
| JP | 02281185 | A | 11/1990 |
| JP | 03053195 | A | 3/1991 |
| JP | 3086258 | A | 4/1991 |
| JP | 6228824 | A | 8/1994 |
| JP | 8304388 | A | 11/1996 |
| JP | 9286943 | A | 11/1997 |
| JP | 10060331 | | 3/1998 |
| JP | 11133661 | A | 5/1999 |
| JP | 2000158364 | A | 6/2000 |
| JP | 2001017970 | | 1/2001 |
| JP | 2001252588 | A | 9/2001 |
| JP | 2003103152 | A | 4/2003 |
| JP | 2004020176 | | 1/2004 |
| JP | 2004020176 | A | 1/2004 |
| JP | 2004256783 | A | 9/2004 |
| JP | 2005118688 | A | 5/2005 |
| KR | 20020073778 | A | 9/2002 |
| KR | 1020050013858 | A | 2/2005 |
| KR | 1020050113356 | A | 12/2005 |
| WO | 9400757 | | 1/1994 |
| WO | 9420833 | | 9/1994 |
| WO | 9429873 | A | 12/1994 |
| WO | 9600318 | | 1/1996 |
| WO | 9743026 | | 11/1997 |
| WO | 9817373 | | 4/1998 |
| WO | 9844058 | | 10/1998 |
| WO | 9933520 | | 7/1999 |
| WO | 0004978 | | 2/2000 |
| WO | 0041794 | | 7/2000 |
| WO | 0139200 | A | 5/2001 |
| WO | 0222252 | | 3/2002 |
| WO | 0250511 | | 6/2002 |
| WO | 03012800 | | 2/2003 |
| WO | 03102737 | | 12/2003 |
| WO | 2004026452 | | 4/2004 |
| WO | 2004064487 | | 8/2004 |
| WO | 2005011804 | | 2/2005 |
| WO | 2006037591 | | 4/2006 |
| WO | 2006043970 | A2 | 4/2006 |
| WO | 2006073645 | A1 | 7/2006 |
| WO | 2006093804 | | 9/2006 |
| WO | 2007060245 | A1 | 5/2007 |
| WO | 2007095871 | | 8/2007 |
| WO | 2008029379 | | 3/2008 |
| WO | 2008047259 | | 4/2008 |
| WO | 2008085806 | | 7/2008 |

OTHER PUBLICATIONS

U.S. Appl. No. 11/530,210, filed Sep. 8, 2006, Janssen.
U.S. Appl. No. 11/530,311, filed Sep. 8, 2006, Janssen.
International Search Report and Written Opinion regarding PCT/IB2007/052947, dated Mar. 12, 2008.
International Search Report and Written Opinion regarding PCT/IB2007/052945, dated Feb. 1, 2008.
International Search Report and Written Opinion regarding PCT/IB2007/052988, dated Feb. 14, 2008.
Taleyarkhan, et al., "Evidence for Nuclear Emissions During Acoustic Cavitation," Science, (Mar. 8, 2002), vol. 295, pp. 1868-1873.
Kloeppel, James E. "Temperature inside collapsing bubble four times that of the sun," News Bureau, University of Illinois at Urbana-Champaign.
Tal-Figiel B., The Formation of Stable W/O, O/W, W/O/W Cosmetic Emulsions in an Ultrasonic Field, viewed at http://www.atypon-link.com/ICHEME/doi/abs/10.1205/cherd06199 on Oct. 19, 2007.
"Controlled Thermonuclear Fusion" viewed at http://library.thinkquest.org/17940/texts/fusion_controlled/fusion_controlled.html on Oct. 23, 2007.
Flannigan, "Measurement of Pressure and Density Inside a Single Sonoluminescing Bubble," Physical Review Letters (May 26, 2006), PRL 96.
Taleyarkhan, et al. "Additional Evidence of Nuclear Emissions During Acoustic Cavitation," Physical Review E, (Mar. 2004). vol. 69.
"Thermonuclear Fusion Energy Source for Future Generations," viewed at http://nature.com/news/2006/060109/full/060109-5.html on May 4, 2007.
Lahey, Taleyarkhan, and Nigmatulin, "Bubble Power, "IEEE spectrum, May 2005, pp. 39-43.
International Search Report and Written Opinion regarding PCT/IB2007/053621, dated Feb. 14, 2008.
International Search Report and Written Opinion regarding PCT/IB2007/053623, dated Feb. 14, 2008.
International Search Report and Written Opinion regarding PCT/IB2007/053622, dated Feb. 14, 2008.
U.S. Appl. No. 11/777,140, filed Jul. 12, 2007.
U.S. Appl. No. 11/963,237, filed Dec. 21, 2007.
U.S. Appl. No. 11/617,515, filed Dec. 28, 2006.
U.S. Appl. No. 11/777,151, filed Jul. 12, 2007.
U.S. Appl. No. 11/950,943, filed Dec. 5, 2007.
U.S. Appl. No. 11/963,139, filed Dec. 21, 2007.
U.S. Appl. No. 11/966,458, filed Dec. 28, 2007.
U.S. Appl. No. 11/966,472, filed Dec. 28, 2007.
U.S. Appl. No. 11/966,418, filed Dec. 28, 2007.
U.S. Appl. No. 11/966,447, filed Dec. 28, 2007.
U.S. Appl. No. 11/777,145, filed Dec. 12, 2007.
U.S. Appl. No. 11/965,435, filed Dec. 27, 2007.
Peplow, Mark, "Desktop fusion is back on the table," viewed at http//nature.com/news/2006/060109/full/060109-5.html on May 4, 2007.
International Search Report and Written Opinion regarding PCT/IB2007/054892 dated May 15, 2008.
International Search Report and Written Opinion regarding PCT/IB2007/054898, dated May 15, 2008.
International Search Report and Written Opinion regarding PCT/IB2008/055394, dated Sep. 28, 2009.
Blume, T. and Neis, U. "Improved wastewater disinfection by ultrasonic pre-treatment." Ultrasonics Sonochemistry, 2004, No. 11, pp. 333-336.

International Search Report and Written Opinion for PCT/IB2008/052764 mailed Apr. 2, 2009.

International Search Report and Written Opinion regarding PCT/IB2008/052760, dated Feb. 17, 2009.

International Search Report and Written Opinion, PCT/IB2008/055051 (Feb. 20, 2009).

Non-final office action regarding U.S. Appl. No. 11/617,497, dated Jun. 26, 2009.

Final Office Action Regarding U.S. Appl. No. 11/530,311, dated Jun. 23, 2009.

International Search Report and Written Opinion issued Aug. 18, 2009 for PCT/IB2008/055520.

International Search Report and Written Opinion issued Aug. 18, 2009 for PCT/IB2008/055517.

International Search Report and Written Opinion issued Aug. 18, 2009 for PCT/IB2008/055518.

International Search Report and Written Opinion regarding PCT/IB2008/055395, dated Sep. 14, 2009.

International Search Report and Written Opinion from PCT/IB2008/052766, dated Mar. 31, 2009.

Non-final office action regarding U.S. Appl. No. 11/950,943, dated May 1, 2009.

J.D. Lawson, "Some Criteria for a Power Producing Thermonuclear Reactor", Proc. Phys. Soc. B70, pp. 6-10 (1957).

L.A. Artsimovich, "Controlled Thermonuclear Reactions", Gordon and Breach Science Publishers, New York, first English translation, 1964.

D.R.O. Morrison, "Cold Fusion Update No. 9", Jan. 1994, from Newsgroups sci.physics.fusion, http://www.groups.google.com.

Brenner et al, Single-bubble sonoluminescence, Reviews of Modern Physics, vol. 74, Apr. 2002, pp. 425-484.

J. Lister, Plasma Physics and Controlled Fusion 48, pp. 715-716 (2006).

U.S. Department of Energy, "Report of the Review of Low Energy Nuclear Reactions", Dec. 1, 2004 (USDOE).

International Search Report and Written Opinion regarding PCT/IB2008/055396, dated Jul. 29, 2009.

International Search Report and Written Opinion regarding PCT/IB2008/055514, dated Aug. 25, 2009.

\* cited by examiner

ULTRASONIC LIQUID TREATMENT SYSTEM

FIELD OF INVENTION

This invention relates generally to systems for ultrasonically treating a liquid, more particularly for ultrasonically treating a flowing liquid in a treatment chamber in which particulate material is present in the chamber.

BACKGROUND

Liquid reaction or treatment chambers find numerous applications for enhancing the treatment of liquids such as a single component liquid, liquid-liquid reaction and/or mixing, liquid-gas reaction and/or mixing and liquid-particulate material reaction and/or mixing. For example, in formulating inks, paints and other viscous materials two or more components (at least one being a liquid) are mixed together in such a treatment chamber to form the applicable solution. Other examples include the simultaneous introduction of various liquids and gases into the chamber to promote certain reactions. This would include the flow of water into the chamber with the introduction of gases such as air and/or oxygen and/or ozone only to mention a few. Also such chambers can be used to induce a variety of chemical reactions such as the decomposition of hydrogen peroxide, emulsion polymerization reactions and the creation of emulsions for emulsion polymerization mechanisms.

In other applications, treatment chambers can be used for the deagglomeration of particles in a liquid stream. This would include the deagglomeration of nano-particles such as pigments used in the formulation of inks. Plus the simultaneous formulation of an ink using these nano-pigment particles. This system can also have the simultaneous exposure to UltraViolet (UV) light to promote certain reactions of fluids or fluid/gas or fluid/gas/solids systems in the ultrasonic chamber. Another application could be in the medical field where a treatment chamber is used in the preparation of pharmaceutical formulations that are composed of powders/liquids and liquids for dispensing for use.

In particular, it is often advantageous to provide the chamber with some agitating mechanism by which liquid is agitated within an elongate column or chamber. By agitating the liquid, a desired reaction (e.g., mixing or other result) may be expedited and thus capable of being achieved in a continuous flow operation. As a result, treatment chambers that facilitate such agitation are particularly useful in continuous flow treatment processes.

Agitation of a liquid may be referred to as static agitation, in which agitation is caused by the particular flow parameters (e.g., flow rate, pressure, etc.) of the one or more liquid components through a column. Static agitation may also occur by directing a flow of liquid past stationary agitating members, such as a helical vane-type construction or other structures disposed in the flow column or chamber that disrupt and thus turbulate the flow of the liquid to be treated. Dynamic agitation is brought about by moving, e.g., rotating, oscillating, vibrating, etc. one or more agitating members (e.g., vanes, fan blades, etc.) within the treatment chamber through which the liquid flows.

One particularly useful type of dynamic agitation of the liquid results from ultrasonic cavitation, a more rigorous agitation, in the liquid. Ultrasonic cavitation refers to the formation, growth and implosive collapse of bubbles in liquid due ultrasonic energization thereof. Such cavitation results from pre-existing weak points in the liquid, such as gas-filled crevices in suspended particulate matter or transient microbubbles from prior cavitation events. As ultrasound passes through a liquid, the expansion cycles exert negative pressure on the liquid, pulling the molecules away from one another. Where the ultrasonic energy is sufficiently intense, the expansion cycle creates cavities in the liquid when the negative pressure exceeds the local tensile strength of the liquid, which varies according to the type and purity of liquid.

Small gas bubbles formed by the initial cavities grow upon further absorption of the ultrasonic energy. Under the proper conditions, these bubbles undergo a violent collapse, generating very high pressures and temperatures. In some fields, such as what is known as sonochemistry, chemical reactions take advantage of these high pressures and temperatures brought on by cavitation. However, the growth and violent collapse of the bubbles themselves provides a desirably rigorous agitation of the liquid. Cavitation that occurs at the interface between the ultrasonically energized liquid and a solid surface is rather asymmetric and generates high speed jets of liquid, further agitating the liquid. This type of cavitation is particularly useful, for example, in facilitating a more complete mixing together of two or more components of a liquid solution.

It is known to pack some treatment chambers with a bed of particles, such as in the manner of a fluidized bed reactor. The particles are thus in the flow path of the liquid within the treatment chamber and further facilitate treatment of the liquid. However, where such particles are present in the chamber, the chamber must be configured to prevent the particles from being carried (or forced) out of the chamber by the liquid flowing therein. For example, a screen element may block the outlet of the chamber to block the particles, but not the liquid, from exiting the chamber. While such a screen element can be effective, there is a risk that the particles will agglomerate or otherwise build up on the screen element and reduce the flow rate of the liquid out of the chamber, thereby increasing the pressure in the chamber.

There is need, therefore, for a continuous flow ultrasonic liquid treatment chamber that takes advantage of the benefits of ultrasonic energy to treat a flowing liquid, particularly where particles are used in such a treatment chamber, while maintaining desired operation conditions of the treatment chamber.

SUMMARY

In one embodiment, an ultrasonic treatment chamber for ultrasonically treating a liquid generally comprises an elongate housing having longitudinally opposite ends and an interior space, with the housing being generally closed at its longitudinal ends and having an inlet port for receiving liquid into the interior space of the housing and an outlet port through which liquid is exhausted from the housing following ultrasonic treatment of the liquid. The outlet port is spaced longitudinally from the inlet port such that liquid flows longitudinally within the interior space of the housing from the inlet port to the outlet port. An elongate ultrasonic waveguide assembly extends longitudinally within the interior space of the housing and is operable at a predetermined ultrasonic frequency to ultrasonically energize liquid flowing within the housing. The waveguide assembly generally comprises an elongate ultrasonic horn disposed intermediate the inlet port and the outlet port of the housing and having an outer surface located for contact with liquid flowing within the housing from the inlet port to the outlet port. The waveguide assembly has a terminal end spaced longitudinally from the outlet port of the housing. A standing wave member is disposed within the housing longitudinally intermediate the outlet port of the housing and the terminal end of the waveguide assembly. The standing wave member is spaced from the terminal end of the waveguide assembly so as to define an acoustic standing wave therebetween upon operation of the waveguide assembly at the predetermined ultrasonic frequency.

In another embodiment, an ultrasonic treatment system for ultrasonically treating a liquid generally comprises an elongate, generally tubular housing having longitudinally opposite ends and an interior space. The housing has an inlet for receiving liquid into the interior space of the housing and an outlet through which liquid is exhausted from the housing following ultrasonic treatment of the liquid. The outlet is spaced longitudinally from the inlet such that liquid flows longitudinally within the interior space of the housing from the inlet to the outlet. An elongate ultrasonic horn extends longitudinally within the interior space of the housing intermediate the inlet and the outlet of the housing. A drive system is operable to ultrasonically vibrate the ultrasonic horn, with the ultrasonic treatment system being configured such that operation of the drive system generates mechanical vibration of the horn within the interior space of the housing and further generates a standing acoustic wave within the interior space of the housing.

In one embodiment of a process for ultrasonically treating a liquid in an ultrasonic treatment chamber comprised of an elongate, generally tubular housing having an inlet and an outlet spaced longitudinally from the inlet, liquid is directed into the housing at the housing inlet for longitudinal flow within the housing to the housing outlet. Mechanical ultrasonic vibration is generated within the housing in direct contact with the liquid flowing within the housing, with the direct contact being upstream of the housing outlet. A standing acoustic wave is produced within the housing with the standing acoustic wave having a node spaced longitudinally from the housing outlet.

BRIEF DESCRIPTION OF THE DRAWINGS

Corresponding reference characters indicate corresponding parts throughout the drawings.

DETAILED DESCRIPTION

Figure 1:
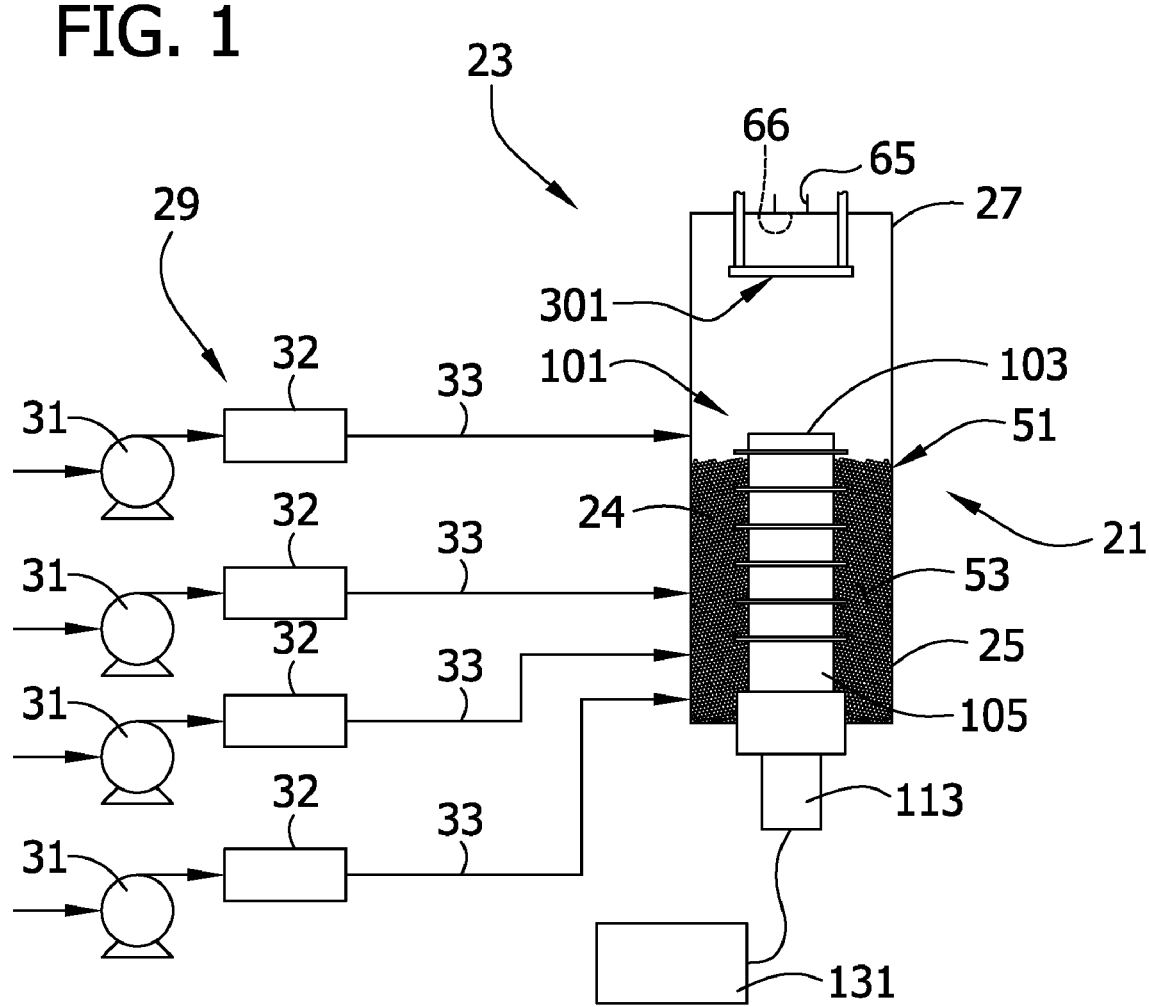
FIG. 1 is a schematic of one embodiment of a system for ultrasonically treating a liquid.

With reference now to the drawings, and in particular to FIG. 1, in one embodiment a system for ultrasonically treating a liquid generally comprises an ultrasonic treatment chamber, generally indicated at 21, that is operable to ultrasonically treat a liquid with both mechanical vibration and with a standing acoustic wave. The term "liquid" as used herein is intended to refer to a single component liquid, a solution comprised of two or more components in which at least one of the components is a liquid such as a liquid-liquid mixture, a liquid-gas mixture or a liquid in which particulate matter is entrained, or other viscous fluids.

The ultrasonic treatment chamber 21 is illustrated schematically in the embodiment of FIG. 1 and described further herein with reference to use of the treatment chamber generally in the manner of a packed bed or fluidized bed reactor in which the chamber is packed at least in part with particulate matter (broadly referred to herein as chamber particles 24), typically spherically shaped beads or particles, for treating liquid as the liquid passes through the chamber. In the particular embodiment illustrated in FIG. 1, a liquid treatment system 23 is configured to utilize the ultrasonic treatment chamber 21 for mixing together two or more components of a liquid solution.

For example, some contemplated mixing uses for the ultrasonic treatment chamber 21 include, without limitation, mixing resins and curing agents for the plastic industry; mixing pulp slurries with chemical additives such as bleaching agents, wet strength agents, starches, dyes, enzymes, fillers, anti-slime agents, silicone additives, etc.; mixing compounds used in the paper and tissue industries, such as clay slurries for coatings, polymeric additives such as wet strength resins, starch suspensions, silicone compounds, lotions, filler suspensions, etc.; mixing resins and coloring agents, fillers, and other compounds; mixing immiscible phases to prepare emulsions, such as food emulsions (e.g., for sun block products, hand lotions, lipstick compounds, etc.), cosmetics, cleaning agents (including nanoemulsions of oil and water), pharmaceutical compounds, etc; and mixing coloring agents and other compounds to form cosmetics such as hair dyes; mixing pulp slurries with chemical additives such as bleaching agents, wet strength agents, starches, dyes, etc.; and mixing compounds used in the paper and tissue industries, such as clay slurries.

It is understood, however, that the ultrasonic liquid treatment chamber 21 may be used with liquid ultrasonic treatment systems other than for mixing but where passing a liquid through a bed of particulate material at least in part comprises the desired treatment of the liquid. Non-limiting examples include food processing and treatment; degassing solutions (e.g., pulling dissolved gasses from liquid solutions such as oxygen, nitrogen, ammonia, etc.); and enhancing chemical reactions, for example, as is common in sonochemistry where excitation is imparted to a chemical reaction to expedite the reaction.

Additional examples include degassing a mixture to simplify subsequent treatment and reduce void formation; deinking recycled papermaking fibers, in which ultrasonic energy may assist in removal of inks (particularly in the presence of enzymes, detergents, or other chemicals); hydrogenating oils, cheese, or other food stuffs, in which gas and slurries or liquids must be mixed; homogenizing milk and other compounds; treating wastewater and/or manure, in which a variety of additives and air bubbles may need to be mixed with a slurry; manufacturing petrochemicals such as lubricant mixtures, gasoline blends, wax mixtures, etc., and compounds derived from petrochemicals; processing dough (e.g., mixing combinations of agents to be added to flour or processing the dough itself, which may result in improved breakdown of gluten, etc.). The ultrasonic treatment chamber 21 may also be used in chemical reactors involving single or multiple phases, including slurries.

In other contemplated uses, the ultrasonic treatment chamber 21 may be used to remove entrapped gas bubbles from coating solutions that are used in gravure coating, meyer rod coating or any other coating applications where it is desirable to remove air bubbles from a solution. The ultrasonic treatment chamber 21 may also be used to remove liquid or solid material from a solution, such as where the chamber particles comprise an adsorbent material.

In particular, the ultrasonic treatment chamber 21 is suitable for use in liquid treatment systems in which ultrasonic treatment of the liquid is desired in an in-line, e.g., continuous flow process in which fluid flows continuously through the chamber. It is contemplated, though, that the treatment chamber 21 may be used in a liquid treatment system in which liquid is treated in accordance with a batch process instead of a continuous flow process and remain with the scope of this invention.

In the illustrated embodiment of FIG. 1, the ultrasonic treatment chamber 21 is generally elongate and has an inlet end 25 (a lower end in the orientation of the illustrated embodiment) and an outlet end 27 (an upper end in the orientation of the illustrated embodiment). The system 23 is configured such that liquid enters the treatment chamber 21 generally at the inlet end 25 thereof, flows generally longitudinally within the chamber (e.g., upward in the orientation of illustrated embodiment) and exits the chamber generally at the outlet end of the chamber.

The terms "upper" and "lower" are used herein in accordance with the vertical orientation of the ultrasonic treatment chamber 21 illustrated in the various drawings and are not intended to describe a necessary orientation of the chamber in use. That is, while the chamber 21 is most suitably oriented vertically, with the outlet end 27 of the chamber above the inlet end 25 as illustrated in the various drawings, it is understood that the chamber may be oriented with the inlet end above the outlet end, or it may be oriented other than in a vertical orientation and remain within the scope of this invention.

The terms axial and longitudinal refer directionally herein to the lengthwise direction of the chamber 21 (e.g., end-to-end such as the vertical direction in the illustrated embodiments). The terms transverse, lateral and radial refer herein to a direction normal to the axial (e.g., longitudinal) direction. The terms inner and outer are also used in reference to a direction transverse to the axial direction of the ultrasonic treatment chamber 21, with the term inner referring to a direction toward the interior of the chamber (e.g., toward the longitudinal axis of the chamber) and the term outer referring to a direction toward the exterior of the chamber (e.g., away from the longitudinal axis of the chamber).

The inlet end 25 of the ultrasonic treatment chamber 21 is in fluid communication with a suitable delivery system, generally indicated at 29, that is operable to direct one or more liquid components to, and more suitably through, the chamber 21. For example, in the illustrated treatment system 23 of FIG. 1 the delivery system 29 comprises a plurality of pumps 31 (such as one pump for each component of the solution to be mixed in the chamber) operable to pump the respective components from a corresponding source (illustrated schematically in FIG. 1 as reference number 32) thereof to the inlet end 25 of the chamber 21 via suitable conduits (illustrated schematically in FIG. 1 as reference number 33). As an example, four such pumps 31, component sources and corresponding conduits 33 are shown in FIG. 1.

It is understood that the delivery system 29 may be configured to deliver less than four (including one), or more than four components to the treatment chamber 21 without departing from the scope of this invention. It is also contemplated that delivery systems other than that illustrated in FIG. 1 and described herein may be used to deliver one or more components to the inlet end 25 of the ultrasonic treatment chamber 21 without departing from the scope of this invention.

Figure 2:
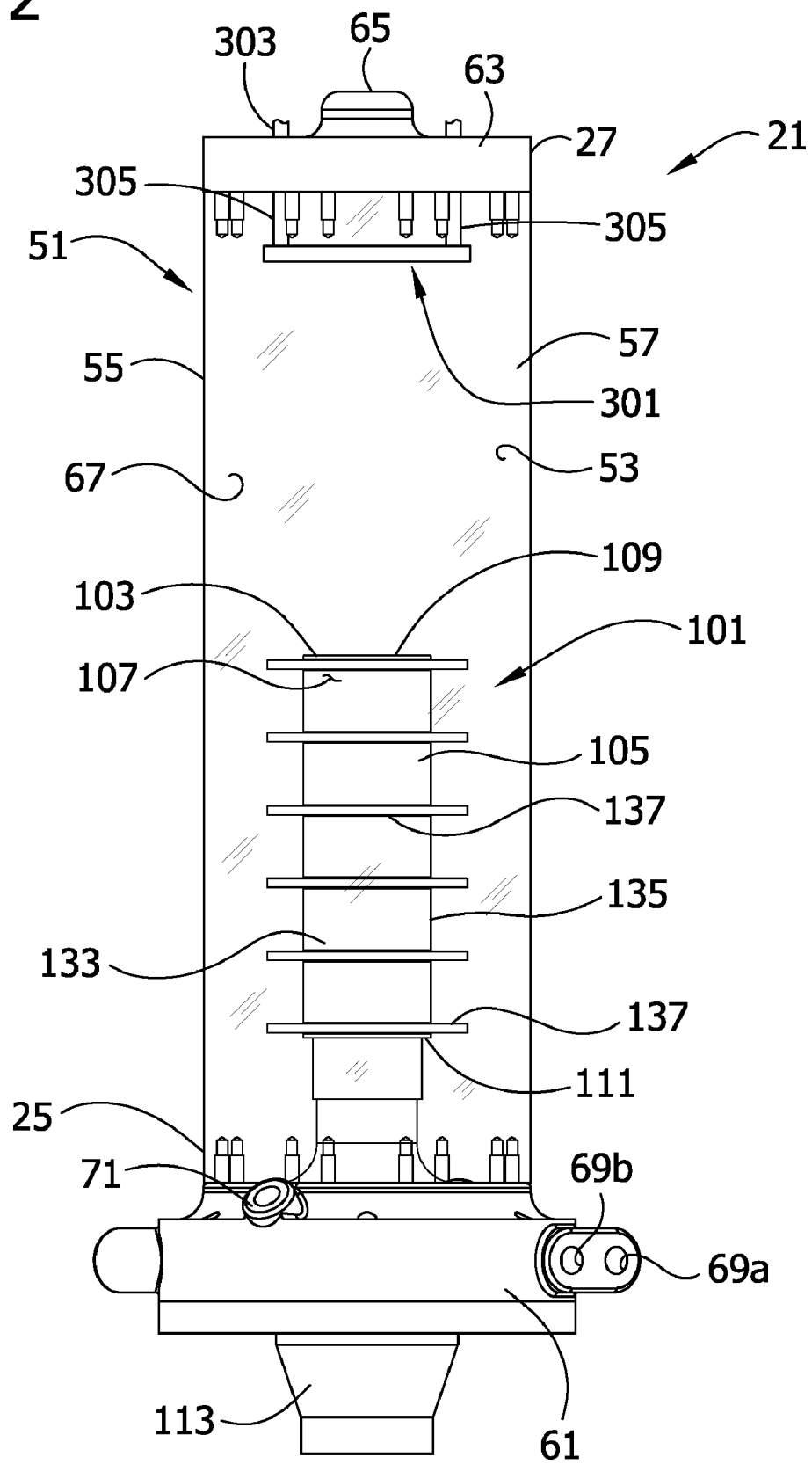
FIG. 2 is a side elevation of an ultrasonic treatment chamber of the system of FIG. 1, with a bed of particles omitted from the treatment chamber.

With reference now to FIG. 2, the ultrasonic treatment chamber 21 of the liquid treatment system 23 comprises a housing 51 defining an interior space 53 of the chamber through which liquid delivered to the chamber flows from the inlet end 25 to the outlet end 27 thereof. The housing 51 suitably comprises an elongate tube 55 generally defining, at least in part, a sidewall 57 of the chamber 21. In the illustrated embodiment, the housing 51 further comprises an inlet collar 61 connected to and mounted on one end of the tube 55 to define the inlet end 25 of the chamber 21.

The housing 51 also comprises a closure 63 connected to and substantially closing the longitudinally opposite end of the sidewall 57, and having at least one outlet port 65 (broadly, an outlet) therein to generally define the outlet end 27 of the treatment chamber 21. The closure 63 also has a screen element 66 held in assembly therewith and blocking the outlet port 65 (e.g., between the outlet port and the interior space 53 of the chamber 21) to inhibit the chamber particles 24 from flowing out of the chamber through the outlet port along with the liquid solution. The sidewall 57 (e.g., defined by the elongate tube 55) of the chamber 21 has an inner surface 67 that together with the collar 61 and the closure 63 define the interior space 53 of the chamber.

In the illustrated embodiment, the tube 55 is generally cylindrical so that the chamber sidewall 57 is generally annular in cross-section. However, it is contemplated that the cross-section of the chamber sidewall 57 may be other than annular, such as polygonal or another suitable shape, and remain within the scope of this invention. The chamber sidewall 57 of the illustrated chamber 21 is suitably constructed of a transparent material, although it is understood that any suitable material may be used as long as the material is compatible with the liquid components being treated in the chamber, the pressure at which the chamber is intended to operate, and other environmental conditions within the chamber such as temperature.

Figure 3:
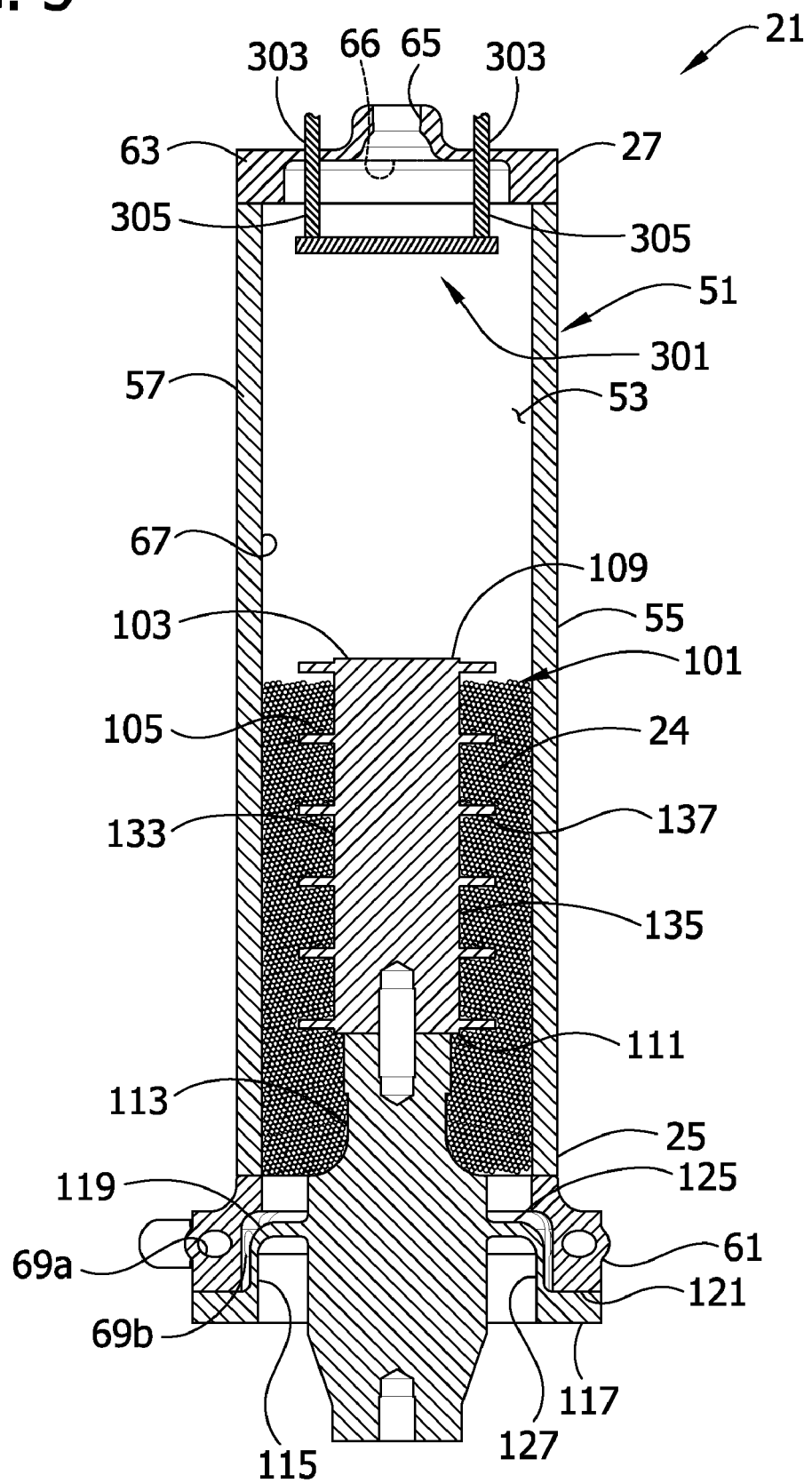
FIG. 3 is a longitudinal (e.g., vertical) cross-section of the ultrasonic treatment chamber of FIG. 2.
Figure 3A:
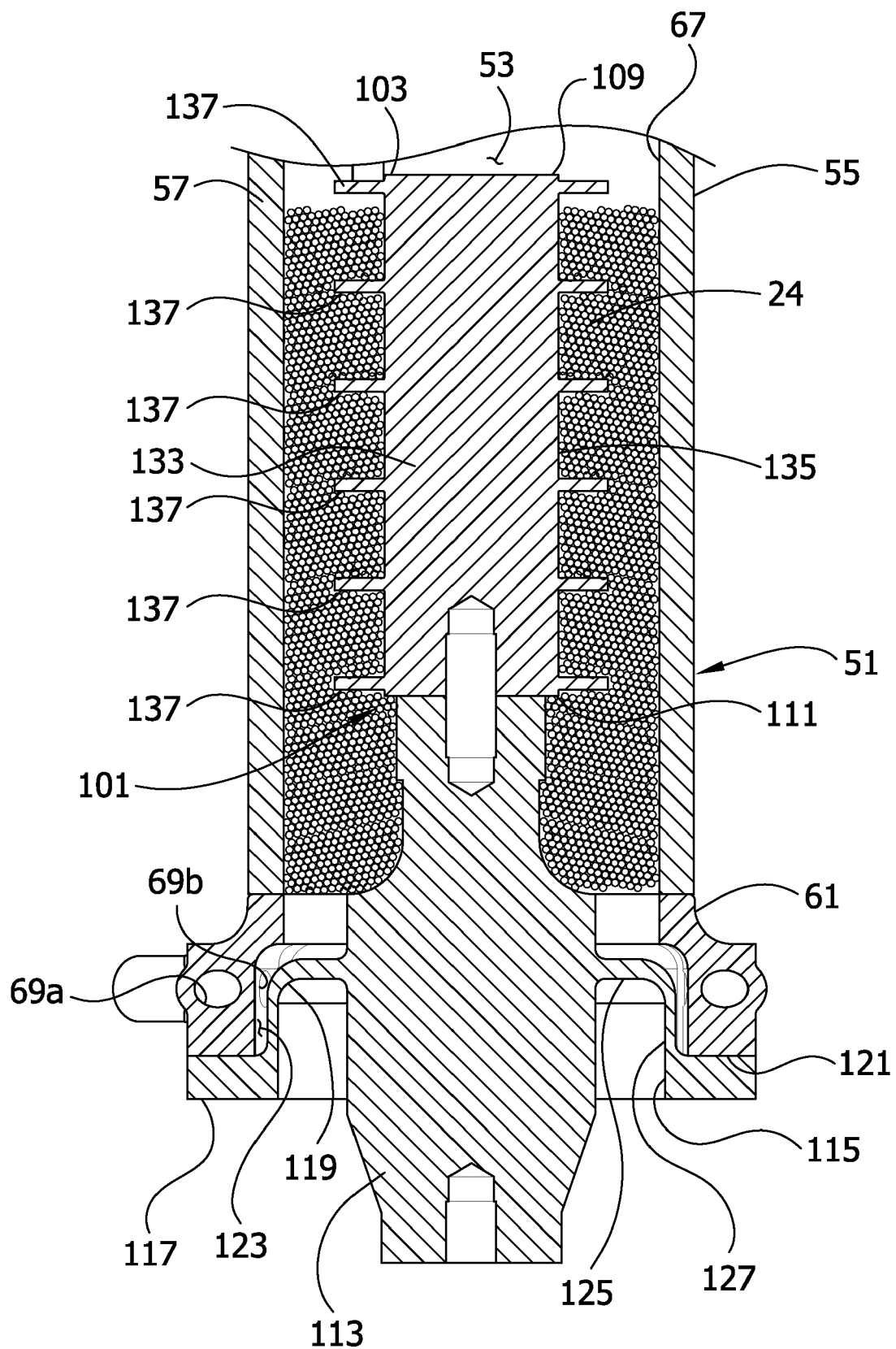
FIG. 3A is an enlarged, fragmented view of a portion of the cross-section of FIG. 3.
Figure 3B:
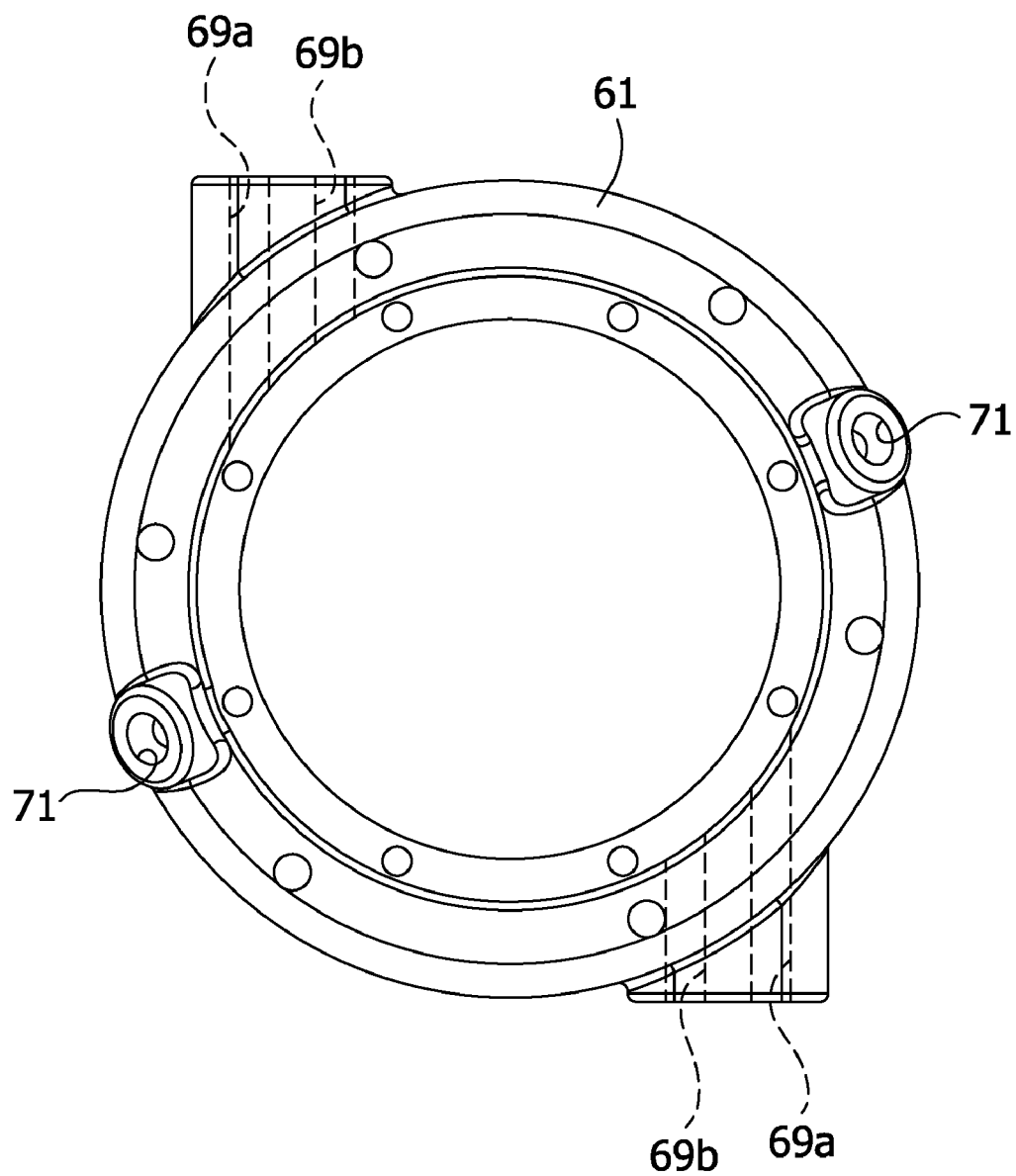
FIG. 3B is a top plan view of a collar that forms part of the housing of the ultrasonic treatment chamber of FIG. 2.

With particular reference to FIG. 3B, the inlet collar 61 at the inlet end 25 of the chamber 21 is generally annular and has at least one, and more suitably a plurality of inlet ports 69a, 69b (broadly, an inlet) formed therein for receiving liquid solution components into the interior space 53 of the chamber 21. At least one inlet port 69a is oriented generally tangentially relative to the annular collar 61 so that liquid flows into the interior space 53 of the chamber 21 generally tangentially thereto to impart a swirling action to liquid as it enters the chamber. More suitably, in the illustrated embodiment a pair of inlet ports 69a, 69b are arranged in parallel alignment with each and extend generally tangentially relative to the annular collar 61, with one port 69a being designated herein as the outer inlet port and the other port 69b being designated the inner inlet port.

This dual tangential inlet port 69a, 69b arrangement is particularly useful for initiating mixing of two or more components together before the liquid solution is further subjected to ultrasonic treatment within the chamber 21. In a particularly suitable use of this arrangement, where the liquid to be treated in the chamber 21 comprises two or more liquids, the liquid having the lowest viscosity is directed to flow into the chamber via the outer inlet port 69a while the liquid having the highest viscosity is directed to flow into the chamber via the inner inlet port 69b. The flow of the lower viscosity ingredient through the outer inlet port 69a has a tendency to draw the higher viscosity ingredient into the interior space 53 of the chamber 21 to speed the rate at which the higher viscosity ingredient is introduced into the chamber.

This action, combined with the swirling action resulting from the tangential direction in which the liquid components are directed into the chamber 21, facilitate an initial mixing of these two components before the liquid solution flows further through the chamber for ultrasonic treatment. In the illustrated embodiment, the collar 61 also has an additional tangential set of inlet ports 69a, 69b and a pair of generally vertically oriented inlet ports 71. It is understood, however, that none of the ports 69a, 69b need to be oriented tangentially relative to the collar 61 to remain within the scope of this invention. It is also understood that the number of inlet ports 69a, 69b, 71 may vary, and may even be limited to a single inlet port.

An ultrasonic waveguide assembly, generally indicated at 101, extends longitudinally at least in part within the interior space 53 of the chamber 21 to ultrasonically energize liquid (and any other components of the liquid solution) flowing through the interior space 53 of the chamber, as well as to ultrasonically energize the chamber particles 24. In particular, the ultrasonic waveguide assembly 101 of the illustrated embodiment extends longitudinally from the lower or inlet end 25 of the chamber 21 up into the interior space 53 thereof to a terminal end 103 of the waveguide assembly disposed intermediate the inlet ports 69a, 69b and the outlet port 65. More suitably, the waveguide assembly 101 is mounted, either directly or indirectly, to the chamber housing 51 as will be described later herein.

The ultrasonic waveguide assembly 101 suitably comprises an elongate horn assembly, generally indicated at 105, disposed entirely with the interior space 53 of the housing 51 intermediate the uppermost inlet port and the outlet port for complete submersion within the liquid being treated within the chamber 21, and more suitably it is aligned coaxially with the chamber sidewall 57. The horn assembly 105 has an outer surface 107 that together with the inner surface 67 of the sidewall 57 defines a flow path within the interior space 53 of the chamber 21 along which liquid and other components flow past the horn assembly within the chamber (this portion of the flow path being broadly referred to herein as the ultrasonic treatment zone). The horn assembly 105 has an upper end 109 defining a terminal end of the horn assembly (and therefore the terminal end 103 of the waveguide assembly) and a longitudinally opposite lower end 111. The waveguide assembly 101 of the illustrated embodiment also comprises a booster 113 coaxially aligned with and connected at an upper end thereof to the lower end 111 of the horn assembly 105. It is understood, however, that the waveguide assembly 101 may comprise only the horn assembly 105 and remain within the scope of this invention. It is also contemplated that the booster 113 may be disposed entirely exterior of the chamber housing 51, with the horn assembly 105 mounted on the chamber housing 51 without departing from the scope of this invention.

The ultrasonic waveguide assembly 101, and more particularly the booster 113 in the illustrated embodiment of FIG. 3, is suitably mounted on the chamber housing 51, e.g., on the tube 55 defining the chamber sidewall 57, at the upper end thereof by a mounting member 115 that is configured to vibrationally isolate the waveguide assembly (which vibrates ultrasonically during operation thereof) from the ultrasonic treatment chamber housing. That is, the mounting member 115 inhibits the transfer of longitudinal and transverse mechanical vibration of the waveguide assembly 101 to the chamber housing 51 while maintaining the desired transverse position of the waveguide assembly (and in particular the horn assembly 105) within the interior space 53 of the chamber housing and allowing both longitudinal and transverse displacement of the horn assembly within the chamber housing. In the illustrated embodiment, the mounting member 115 also at least in part (e.g., along with the booster 113) closes the inlet end 25 of the chamber 21.

As one example, the mounting member 115 of the illustrated embodiment generally comprises an annular outer segment 117 extending transverse to the waveguide assembly 101 in transversely spaced relationship therewith, and a flange member 119 interconnecting the outer segment to the waveguide assembly. While the flange member 119 and transverse outer segment 117 of the mounting member 115 extend continuously about the circumference of the waveguide assembly 101, it is understood that one or more of these elements may be discontinuous about the waveguide assembly such as in the manner of wheel spokes, without departing from the scope of this invention. The outer segment 117 of the mounting member 115 is particularly configured to seat down against a shoulder 121 formed by the inlet collar 61.

As seen best in FIG. 3A, the internal cross-sectional dimension (e.g., internal diameter) of the collar 61 is stepped outward as the collar extends longitudinally downward away from the chamber sidewall 57 to accommodate the flange member 119. In one particularly suitable embodiment, the collar 61 is sufficiently sized to be transversely spaced from the flange member 119 to define a generally annular gap 123 therebetween in which liquid delivered to the chamber 21 via the inlet ports 69a, 69b of the collar enters the interior space 53 of the chamber. This annular gap 123 further facilitates the swirling action of the liquid upon entry into the chamber 21 via the collar inlet ports 69a, 69b.

The mounting member 115 is suitably sized in transverse cross-section so that at least an outer edge margin of the outer segment 117, and more suitably a substantial transverse portion of the outer segment is seated on the shoulder 121 formed on the collar 61. A suitable fastening system (not shown), such as a plurality of bolts and corresponding nuts (not shown), secures the outer segment 117 of the mounting member 115 to the shoulder 121 formed by the collar 61 to thereby connect the booster 113 (and more broadly the waveguide assembly 101) to the chamber housing 51.

The flange member 119 may suitably be constructed relatively thinner than the outer segment 117 of the mounting member 115 to facilitate flexing and/or bending of the flange member 119 in response to ultrasonic vibration of the waveguide assembly 101. As an example, in one embodiment the thickness of the flange member 119 may be in the range of about 0.2 mm to about 5 mm, and more suitably about 2.5 mm. The flange member 119 of the illustrated mounting member 115 suitably has an inner transverse component 125 connected to the waveguide assembly 101 and extending generally transversely outward therefrom but inward of the outer segment 117 of the mounting member, and an axial, or longitudinal component 127 interconnecting the transverse inner component with the outer segment of the mounting member and together with the transverse inner component generally forming a generally L-shaped cross-section of the flange member 119. It is contemplated, however, that the flange member 119 may instead have a generally U-shaped cross-section or other suitable cross-sectional shape such as an H-shape, an I-shape, an inverted U-shape and the like and remain within the scope of this invention. Additional examples of suitable mounting member 115 configurations are illustrated and described in U.S. Pat. No. 6,676,003, the entire disclosure of which is incorporated herein by reference to the extent it is consistent herewith.

The longitudinal component 127 of the illustrated flange member 119 is suitably cantilevered to the transverse outer segment 117 and to the transverse inner component 125 of the flange member, while the inner component of the flange member is cantilevered to the waveguide assembly 101. Accordingly, the flange member 119 is capable of dynamically bending and/or flexing relative to the outer segment 117 of the mounting member 115 in response to vibratory displacement of the waveguide assembly 101 to thereby isolate the chamber housing 51 from transverse and longitudinal displacement of the waveguide assembly.

While in the illustrated embodiment the transverse outer segment 117 of the mounting member 115 and the transverse inner component 125 of the flange member 119 are disposed generally at longitudinally offset locations relative to each other, it is understood that they may be disposed at generally the same location (e.g., where the flange member is generally U-shaped in cross-section) or at locations other than those illustrated in FIG. 3) without departing from the scope of this invention.

In one particularly suitable embodiment the mounting member 115 is of single piece construction. Even more suitably the mounting member 115 may be formed integrally with the booster 113 (and more broadly with the waveguide assembly 101) as illustrated in FIG. 3. However, it is understood that the mounting member 115 may be constructed separate from the waveguide assembly 101 and remain within the scope of this invention. It is also understood that one or more components of the mounting member 115 may be separately constructed and suitably connected or otherwise assembled together.

In one suitable embodiment the mounting member 115 is further constructed to be generally rigid (e.g., resistant to static displacement under load) so as to hold the waveguide assembly 101 in proper alignment within the interior space 53 of the chamber 21. For example, the rigid mounting member 115 in one embodiment may be constructed of a non-elastomeric material, more suitably metal, and even more suitably the same metal from which the booster 113 (and more broadly the waveguide assembly 101) is constructed. The term rigid is not, however, intended to mean that the mounting member 115 is incapable of dynamic flexing and/or bending in response to ultrasonic vibration of the waveguide assembly 101. In other embodiments, the rigid mounting member 115 may be constructed of an elastomeric material that is sufficiently resistant to static displacement under load but is otherwise capable of dynamic flexing and/or bending in response to ultrasonic vibration of the waveguide assembly 101. While the mounting member 115 illustrated in FIG. 3 is constructed of a metal, and more suitably constructed of the same material as the booster 113, it is contemplated that the mounting member may be constructed of other suitable generally rigid materials without departing from the scope of this invention.

A suitable ultrasonic drive system 131 (shown schematically in FIG. 1) including at least an exciter (not shown) and a power source (not shown) is disposed exterior of the chamber 21 and operatively connected to the booster 113 (and more broadly to the waveguide assembly 101) to energize the waveguide assembly to mechanically vibrate ultrasonically. Examples of suitable ultrasonic drive systems 131 include a Model 20A3000 system available from Dukane Ultrasonics of St. Charles, Ill., and a Model 2000CS system available from Herrmann Ultrasonics of Schaumberg, Ill.

The drive system 131 is suitably capable of operating the waveguide assembly 101 at a frequency in the range of about 15 kHz to about 100 kHz, more suitably in the range of about 15 kHz to about 60 kHz, and even more suitably in the range of about 20 kHz to about 40 kHz. Such ultrasonic drive systems 131 are well known to those skilled in the art and need not be further described herein.

With particular reference to FIG. 3, the horn assembly 105 comprises an elongate, generally cylindrical horn 133 having an outer surface 135, and two or more (i.e., a plurality of) agitating members 137 connected to the horn and extending at least in part transversely outward from the outer surface of the horn in longitudinally spaced relationship with each other. The horn 133 is suitably sized to have a length equal to about one-half of the resonating wavelength (otherwise commonly referred to as one-half wavelength) of the horn. In one particular embodiment, the horn 133 is suitably configured to resonate in the ultrasonic frequency ranges recited previously, and most suitably at 20 kHz. For example, the horn 133 may be suitably constructed of a titanium alloy (e.g., Ti6Al4V) and sized to resonate at 20 kHz. The one-half wavelength horn 133 operating at such frequencies thus has a length (corresponding to a one-half wavelength) in the range of about 4 inches to about 6 inches, more suitably in the range of about 4.5 inches to about 5.5 inches, even more suitably in the range of about 5.0 inches to about 5.5 inches, and most suitably a length of about 5.25 inches (133.4 mm). It is understood, however, that the ultrasonic treatment chamber 21 may include a horn assembly 105 in which the horn 133 is sized to have any increment of one-half wavelength without departing from the scope of this invention.

In the illustrated embodiment, the agitating members 137 comprise a series of six washer-shaped rings that extend continuously about the circumference of the horn member 133 in longitudinally spaced relationship with each other and transversely (e.g., radially in the illustrated embodiment) outward from the outer surface of the horn. In this manner the vibrational displacement of each of the agitating members 137 relative to the horn 133 is relatively uniform about the circumference of the horn. It is understood, however, that the agitating members 137 need not each be continuous about the circumference of the horn 133. For example, the agitating members 137 may instead be in the form of spokes, blades, fins or other discrete structural members that extend transversely outward from the outer surface 135 of the horn 133.

To provide a dimensional example, for the horn 133 of the illustrated embodiment of FIG. 3 having a length of about 5.25 inches (133.4 mm), one of the rings 137 is suitably disposed adjacent the terminal end of the horn 133 (and hence of the waveguide assembly 101), and more suitably is longitudinally spaced approximately 0.063 inches (1.6 mm) from the terminal end of the horn member. In other embodiments the uppermost ring 137 may be disposed at the terminal end of the horn and remain within the scope of this invention. The rings 137 are each about 0.125 inches (3.2 mm) in thickness and are longitudinally spaced from each other (between facing surfaces of the rings) a distance of about 0.875 inches (22.2 mm).

It is understood that the number of agitating members 137 (e.g., the rings in the illustrated embodiment) may be less than or more than six without departing from the scope of this invention. It is also contemplated that in other embodiments the agitating members 137 may be omitted entirely without departing from the scope of this invention, the horn outer surface 135 providing the sole mechanical ultrasonic vibration contact with the liquid in the flow path within the treatment chamber 21. It is further understood that the longitudinal spacing between the agitating members 137 may be other than as illustrated in FIG. 3 and described above (e.g., either closer or spaced further apart). While the rings 137 illustrated in FIG. 3 are equally longitudinally spaced from each other, it is alternatively contemplated that where more than two agitating members are present the spacing between longitudinally consecutive agitating members need not be uniform to remain within the scope of this invention.

In particular, the locations of the agitating members 137 are at least in part a function of the intended vibratory displacement of the agitating members upon vibration of the horn 133. For example, in the illustrated embodiment the horn 133 has a nodal region located generally longitudinally centrally of the horn (e.g., between the third and fourth rings). As used herein, the "nodal region" of the horn 133 refers to a longitudinal region or segment of the horn member along which little (or no) longitudinal displacement occurs during ultrasonic vibration of the horn and transverse (e.g., radial in the illustrated embodiment) displacement of the horn is generally maximized. Transverse displacement of the horn 133 suitably comprises transverse expansion of the horn but may also include transverse movement (e.g., bending) of the horn.

In the illustrated embodiment, the configuration of the one-half wavelength horn 133 is such that the nodal region is particularly defined by a nodal plane (i.e., a plane transverse to the horn member at which no longitudinal displacement occurs while transverse displacement is generally maximized). This plane is also sometimes referred to as a nodal point. Accordingly, agitating members 137 (e.g., in the illustrated embodiment, the rings) that are disposed longitudinally further from the nodal region of the horn 133 will experience primarily longitudinal displacement while agitating members that are longitudinally nearer to the nodal region will experience an increased amount of transverse displacement and a decreased amount of longitudinal displacement relative to the longitudinally distal agitating members.

It is understood that the horn 133 may be configured so that the nodal region is other than centrally located longitudinally on the horn member without departing from the scope of this invention. It is also understood that one or more of the agitating members 137 may be longitudinally located on the horn so as to experience both longitudinal and transverse displacement relative to the horn upon ultrasonic vibration of the horn assembly 105.

Still referring to FIG. 3, the agitating members 137 are sufficiently constructed (e.g., in material and/or dimension such as thickness and transverse length, which is the distance that the agitating member extends transversely outward from the outer surface 135 of the horn 133) to facilitate dynamic motion, and in particular dynamic flexing/bending of the agitating members in response to the ultrasonic vibration of the horn member. In one particularly suitable embodiment, for a given ultrasonic frequency at which the waveguide assembly 101 is to be operated in the ultrasonic chamber (otherwise referred to herein as the predetermined frequency of the waveguide assembly) and a particular liquid to be treated within the chamber 21, the agitating members 137 and horn 133 are suitably constructed and arranged to operate the agitating members in what is referred to herein as an ultrasonic cavitation mode at the predetermined frequency.

As used herein, the ultrasonic cavitation mode of the agitating members refers to the vibrational displacement of the agitating members sufficient to result in cavitation (i.e., the formation, growth, and implosive collapse of bubbles in a liquid) of the liquid being treated at the predetermined ultrasonic frequency. For example, where the liquid flowing within the chamber comprises an aqueous solution, and more particularly water, and the ultrasonic frequency at which the waveguide assembly 101 is to be operated (i.e., the predetermined frequency) is about 20 kHZ, one or more of the agitating members 137 are suitably constructed to provide a vibrational displacement of at least 1.75 mils (i.e., 0.00175 inches, or 0.044 mm) to establish a cavitation mode of the agitating members. It is understood that the waveguide assembly 101 may be configured differently (e.g., in material, size, etc.) to achieve a desired cavitation mode associated with the particular liquid being treated. For example, as the viscosity of the liquid being treated changes, the cavitation mode of the agitating members may need to be changed.

In particularly suitable embodiments, the cavitation mode of the agitating members corresponds to a resonant mode of the agitating members whereby vibrational displacement of the agitating members is amplified relative to the displacement of the horn. However, it is understood that cavitation may occur without the agitating members operating in their resonant mode, or even at a vibrational displacement that is greater than the displacement of the horn, without departing from the scope of this invention.

In one suitable dimensional example, a ratio of the transverse length of at least one and more suitably all of the agitating members 137 to the thickness of the agitating member is in the range of about 2:1 to about 6:1. As another example, the rings 137 illustrated in FIG. 3 each extend transversely outward from the outer surface 135 of the horn 133 a length of about 0.5 inches (12.7 mm) and the thickness of each ring is about 0.125 inches (3.2 mm), so that the ratio of transverse length to thickness of each ring is about 4:1. It is understood, however that the thickness and/or the transverse length of the agitating members 137 may be other than that of the rings illustrated in FIG. 3 without departing from the scope of this invention. Also, while the agitating members 137 (rings) of the illustrated embodiment each have the same transverse length and thickness, it is understood that the agitating members may have different thicknesses and/or transverse lengths.

In the illustrated embodiment, the transverse length of the agitating member 137 also at least in part defines the size (and at least in part the direction) of the flow path along which liquid or other flowable components in the interior space 53 of the chamber 21 flows past the horn assembly 105. For example, the horn 133 illustrated in FIG. 3 has a radius of about 0.875 inches (22.2 mm) and the transverse length of each ring 137 is, as discussed above, about 0.5 inches (12.7 mm). The radius of the inner surface 67 of the housing sidewall 57 is approximately 1.75 inches (44.5 mm) so that the transverse spacing between each ring and the inner surface of the housing sidewall is about 0.375 inches (9.5 mm). It is contemplated that the spacing between the horn outer surface 135 and the inner surface 67 of the chamber sidewall 57 and/or between the agitating members 137 and the inner surface of the chamber sidewall may be greater or less than described above without departing from the scope of this invention.

In general, the horn 133 may be constructed of a metal having suitable acoustical and mechanical properties. Examples of suitable metals for construction of the horn 133 include, without limitation, aluminum, monel, titanium, stainless steel, and some alloy steels. It is also contemplated that all or part of the horn 133 may be coated with another metal such as silver, platinum and copper to mention a few. In one particularly suitable embodiment, the agitating members 137 are constructed of the same material as the horn 133, and are more suitably formed integrally with the horn. In other embodiments, one or more of the agitating members 137 may instead be formed separate from the horn 133 and connected thereto to form the horn assembly 105.

While the agitating members 137 (e.g., the rings) illustrated in FIG. 3 are relatively flat, i.e., relatively rectangular in cross-section, it is understood that the rings may have a cross-section that is other than rectangular without departing from the scope of this invention. The term cross-section is used in this instance to refer to a cross-section taken along one transverse direction (e.g., radially in the illustrated embodiment) relative to the horn outer surface 135). Additionally, although the agitating members 137 (e.g., the rings) illustrated in FIG. 3 are constructed only to have a transverse component, it is contemplated that one or more of the agitating members may have at least one longitudinal (e.g., axial) component to take advantage of transverse vibrational displacement of the horn (e.g., at and near the nodal region of the horn illustrated in FIG. 3) during ultrasonic vibration of the waveguide assembly 101.

Figure 4:
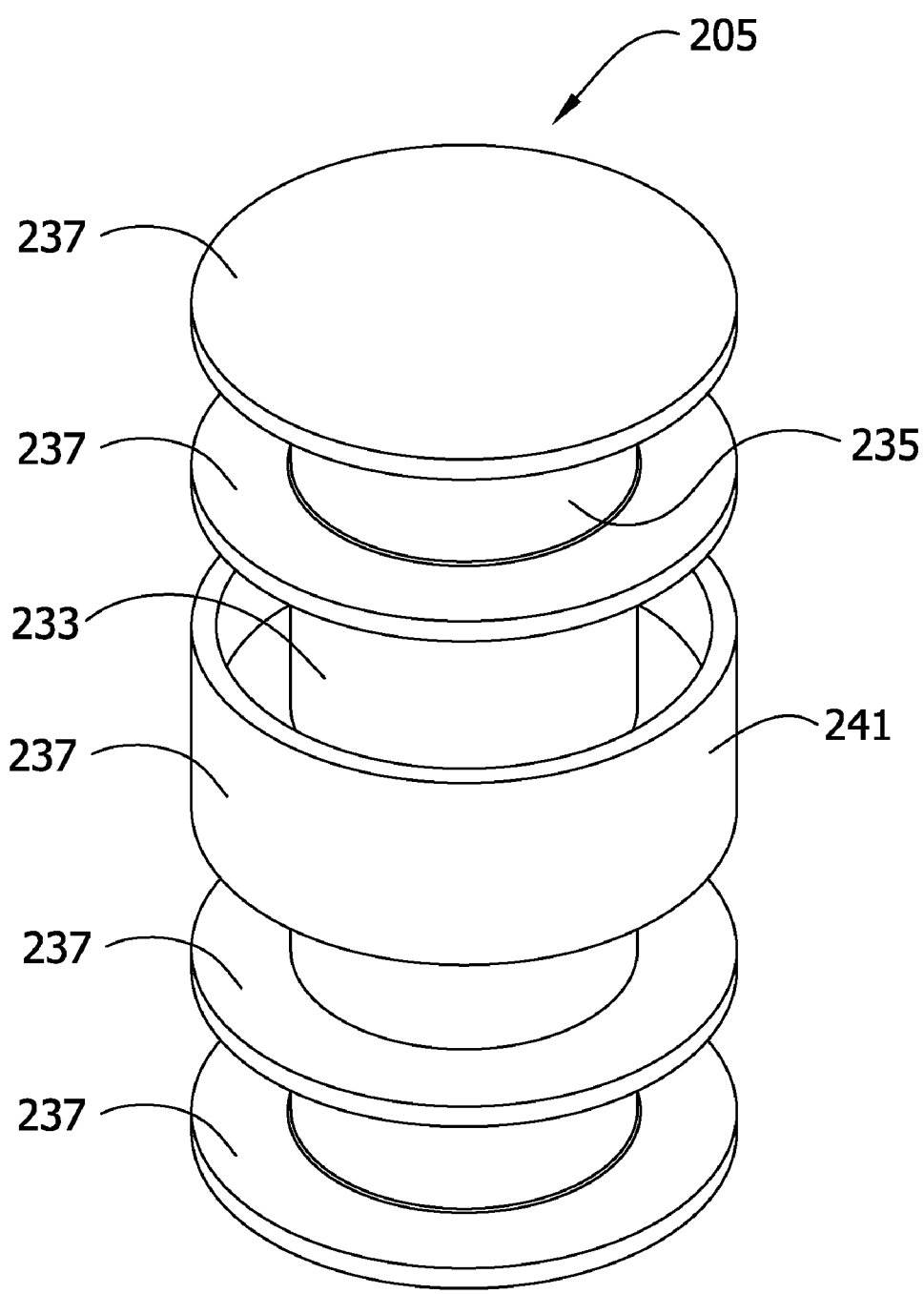
FIG. 4 is a front perspective of an alternative embodiment of a horn assembly.

For example, FIG. 4 illustrates one alternative embodiment of a horn assembly 205 having five agitating members 237 extending transversely outward from the outer surface 235 of the horn 233. While each of the agitating members 237 has a transverse component, e.g., in the form of a ring similar to those of FIG. 3, the centermost agitating member 237 also has an annular longitudinal component 241 secured to the transverse component. In particular, the centermost agitating member 237 is disposed longitudinally generally at the nodal region, and more particularly at the nodal plane of the horn 233 in the illustrated embodiment of FIG. 4, where the transverse displacement of the horn 233 is generally maximized during ultrasonic energization thereof while longitudinal displacement is generally minimized. The longitudinal component 241 is thus capable of dynamic motion (e.g., flexing/bending) in a transverse direction in response to transverse displacement of the horn 233 upon ultrasonic energization of the horn.

It is contemplated that the longitudinal component 241 need not extend entirely longitudinal, i.e., parallel to the outer surface of the horn 233, as long as the longitudinal component has some longitudinal vector to it. Also, while in the illustrated embodiment the agitating member 237 having the longitudinal component 241 is generally T-shaped in cross-section, it is understood that other configurations of such an agitating member are suitable, such as an L-shaped cross-section (with the longitudinal component extending either up or down), a plus-shaped cross-section, or other suitable cross-section. It is also contemplated that one or more holes may formed in the centermost agitating member 237, such as in the transverse component and/or the longitudinal components 241 to allow fluid to flow freely in both the horizontal and vertical direction through this member.

As best illustrated in FIG. 3, the terminal end 103 of the waveguide assembly 101 (e.g., the end 109 of the horn 133 in the illustrated embodiment) is substantially spaced longitudinally from the outlet port 65 (broadly, the outlet) at the outlet end 27 of the chamber 21 to provide what is referred to herein as a buffer zone (i.e., the portion of the interior space 53 of the chamber housing 51 longitudinally beyond the terminal end 103 of the waveguide assembly 101) to allow a more uniform mixing or flow as liquid flows downstream of the terminal end 103 of the waveguide assembly 101 to the outlet end 27 of the chamber. For example, in one suitable embodiment the buffer zone has a void volume (i.e., the volume of that portion of the open space 53 within the chamber housing 51 within the buffer zone) in which the ratio of this buffer zone void volume to the void volume of the remainder of the chamber housing interior space upstream of the terminal end of the waveguide assembly is suitably in the range of about 0.01:1 to about 5.0:1, and more suitably about 1:1.

Providing the illustrated buffer zone is particularly useful where the chamber 21 is used for mixing two or more components together to form a liquid solution such as in the system 23 of FIG. 1. That is, the longitudinal spacing between the terminal end 103 of the waveguide assembly 101 and the outlet port 65 of the chamber 21 provides sufficient space for the agitated flow of the mixed liquid solution to generally settle prior to the liquid solution exiting the chamber via the outlet port. This is particularly useful where, as in the illustrated embodiment, one of the agitating members 137 is disposed at or adjacent the terminal end of the horn 133. While such an arrangement leads to beneficial back-mixing of the liquid as it flows past the terminal end of the horn 133, it is desirable that this agitated flow settle out at least in part before exiting the chamber. It is understood, however, that the terminal end 103 of the waveguide assembly 101 within the interior space 53 of the chamber 21 may be disposed longitudinally nearer to the outlet port 65 at the outlet end 27 of the chamber, or that the buffer zone may even be substantially entirely omitted, without departing from the scope of this invention.

The opposite, e.g., more proximal end of the horn assembly 105 is suitably spaced longitudinally from the collar 61 to define what is referred to herein as a liquid intake zone in which initial swirling of liquid within the interior space 53 of the chamber housing 51 occurs upstream of the horn assembly 105. This intake zone is particularly useful where the treatment chamber 21 is used for mixing two or more components together whereby initial mixing is facilitated by the swirling action in the intake zone as the components to be mixed enter the chamber housing 51. It is understood, though, that the proximal end of the horn assembly 105 may be nearer to the collar 61 than is illustrated in FIG. 3, and may be substantially adjacent to the collar so as to generally omit the intake zone, without departing from the scope of this invention.

In a particularly suitable embodiment the ultrasonic treatment chamber 21 further comprises a standing wave member, generally indicated at 301, in the form of a reflector. The "standing wave member" is intended to refer to a member other than the waveguide assembly 101 that together with the waveguide assembly generates a standing wave therebetween within the chamber housing 51. The reflector 301 is disposed within the interior space 53 of the chamber 21 and more particularly in the buffer zone between the terminal end 103 of the waveguide assembly 101 and the outlet port 65 of the chamber 21 in longitudinally spaced, opposed relationship with the terminal end of waveguide assembly. The location of the reflector 301 in the chamber 21 is also such that the reflector is spaced longitudinally from (e.g., below in the illustrated embodiment) the outlet port 65 and more suitably the screen element 66 of the closure 63. Upon ultrasonic operation of the waveguide assembly 101, the reflector 301 acts in conjunction with the waveguide assembly (which acts in this instance as an ultrasonic transducer) to produce a standing acoustic wave within the buffer zone, and more particularly between the terminal end 103 of the waveguide assembly and the reflector.

It is contemplated that instead of the reflector 301, the standing wave member may be another wave generator, such as a transducer spaced from the waveguide assembly in opposed relationship therewith and operable to generate ultrasonic acoustic wave energy that travels in a direction opposite the wave energy generated by the waveguide assembly to together with the waveguide assembly produce a standing acoustic wave therebetween.

In a particularly suitable embodiment the reflector 301 and waveguide assembly 101 produce a standing acoustic wave therebetween that has at least one node, and which has no node at or adjacent the outlet port 65 and more suitably at or adjacent the screen element 65. That is, any node of the standing wave is spaced longitudinally from at least the outlet port 65 and more suitably from the screen element 66 of the closure 63. For example, the longitudinal spacing between the terminal end 103 of the waveguide assembly 101 and the reflector 301 suitably corresponds to one-half of an acoustic wavelength λ (i.e., a one-half wavelength) wherein the wavelength λ of the standing wave is a function of the liquid flowing within the buffer zone in the chamber 21 and the frequency at which the waveguide assembly (acting as a transducer) is operated. In particular, λ=c/f where;

c=the speed of sound through the liquid in the chamber 21, and f=the operating frequency of the waveguide assembly 101.

In the illustrated embodiment, the position of the reflector 301 is suitably adjustable longitudinally relative to the terminal end 103 of the waveguide assembly 101 to adjust the longitudinal spacing between the reflector and the waveguide assembly. This allows the reflector 301 to be selectively positioned relative to the waveguide assembly 101, depending on the liquid solution being treated and/or the predetermined operating frequency of the waveguide assembly, so as to generate a one-half wavelength standing wave (or a multiple of a one-half wavelength standing wave). In particular, a support frame 303 comprised of two or more support posts 305 extends through the closure 63 down into the interior space 53 of the chamber 21, e.g., past the outlet port 65 and more suitably past the screen element 66 of the closure and is adjustably moveable longitudinally relative to the closure. The reflector 301 is suitably secured to the support frame 303 for conjoint movement with the support frame relative to the closure 63 and waveguide assembly 101. The support frame 303 may be manually adjustable or mechanically adjustable by a suitable adjustment mechanism (not shown).

The reflector 301 of the illustrated embodiment comprises a generally circular solid plate sized for sufficiently spaced relationship with the chamber sidewall 57 so that the reflector does not substantially reduce the flow rate of liquid through the screen element 66 and outlet port 65. The reflector 301 is suitably constructed from a material that has an acoustic impedance greater than that of the liquid flowing within the chamber 21 (e.g., the liquid in which the standing wave is generated), and more suitably substantially greater. For example, in one embodiment the reflector 301 may be constructed from stainless steel. It is understood, however, however that the reflector 301 may be constructed from any suitable material having an impedance greater than that of the liquid in the chamber 21 and remain within the scope of this invention. It is also contemplated that the reflector 301 may be other than plate-shaped and/or other than circular without departing from the scope of this invention.

As illustrated in FIG. 3, the chamber particles 24 are suitably disposed within the interior space 53 of the chamber 21 to a level below (i.e., upstream from) the reflector 301, and more suitably below (or upstream from) the terminal end 103 of the waveguide assembly 101 so that the particles are not initially (e.g., prior to liquid flow through the chamber) disposed within the buffer zone. While the chamber particles 24 are most suitably spherical in shape, it is contemplated that the particles may be of any shape without departing from the scope of this invention. It is also contemplated that the particles 24 may be comprised of any suitable material depending on the intended function (e.g., adsorbent, filtering, agitating, etc.) of the particles. Some non-limiting examples of suitable particle materials include silica, alumina, titania (titanium dioxide), carbon, mica, copper, iron, nickel, zinc, titanium, corundum (silicon carbide) and ceramic. It is also contemplated the surfaces of the particles may be modified to impart additional characteristics thereto. As one example of suitable particles, co-pending U.S. application Ser. No. 11/530,210, entitled DELIVERY SYSTEMS FOR DELIVERING FUNCTIONAL COMPOUNDS TO SUBSTRATES AND PROCESSES OF USING THE SAME and filed Sep. 8, 2006, the entire disclosure of which is incorporated herein by reference, discloses the use of adsorbent particles such as silica or alumina particles to remove desired materials from the liquid flowing through the treatment chamber 21.

In operation of the liquid treatment system 23 illustrated in FIG. 1, the one or more components 32 (with at least one of the components being a liquid) are delivered (e.g., by the pumps 31 in the illustrated embodiment) via the conduits 33 to the inlet ports 69a, 69b formed in the collar 61 of the treatment chamber housing 51. As these components enter the interior space 53 of the chamber 21 via the inlet ports 69a, 69b, the orientation of the inlet ports induces a relatively swirling action to initiate mixing of these components upstream of the horn assembly 105, such as in the fluid intake zone of the interior space of the chamber. The liquid solution flows upward within the chamber 21 past the waveguide assembly 101 and through the bed of chamber particles 24 between the waveguide assembly and the chamber sidewall 57.

The waveguide assembly 101, and more particularly the horn assembly 105, is driven by the drive system 131 to vibrate mechanically at a predetermined ultrasonic frequency. In response to ultrasonic excitation of the horn 133, the agitating members 137 that extend outward from the outer surface 135 of the horn 133 dynamically flex/bend relative to the horn, or displace transversely (depending on the longitudinal position of the agitating member relative to the nodal region of the horn). When using a horn assembly 205 such as that illustrated in FIG. 4 with one of the agitating members 237 disposed at the nodal region of the horn and having a longitudinal 241 component spaced transversely from the horn, the longitudinal component of the agitating member dynamically flexes/bends transversely relative to the horn.

Liquid solution flows continuously longitudinally along the flow path between the horn assembly 105 and the inner surface 67 of the chamber sidewall 57 so that the ultrasonic vibration of the agitating members 137 agitates the liquid solution (and, where liquid solution comprises two or more components, also facilitates mixing of the components). In particularly suitable embodiments, the dynamic motion of the agitating members causes cavitation in the liquid to further facilitate agitation of the liquid solution. The ultrasonic energy imparted by the horn assembly 105 also acts on the chamber particles 24 to promote relative motion of the particles and to inhibit the particles against packing together, i.e., to reduce the risk of reduced flow rate or pressure drop within the ultrasonic treatment chamber 21. The vibratory motion imparted to the particles 24 also reduces the hydrodynamic boundary layer of around each particle to facilitate an increased reaction rate (where a reaction of the liquid components, or reaction between the liquid and the chamber particles such as adsorption, is intended to occur) within the chamber 21.

Figure 5:
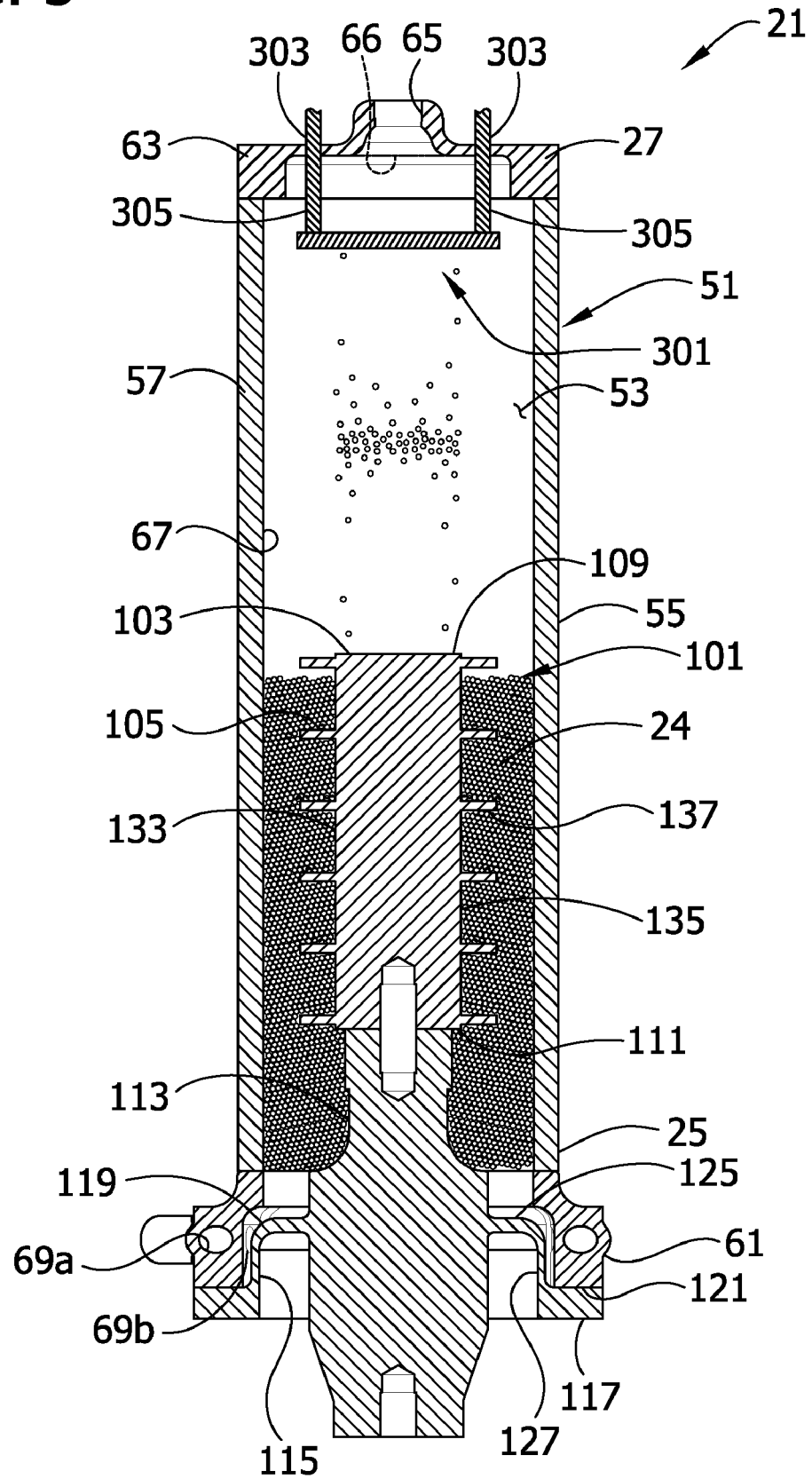
FIG. 5 is a schematic cross-section of the ultrasonic treatment chamber similar to that of FIG. 3 during operation according to one embodiment of a process for ultrasonically treating a liquid.

Ultrasonic operation of the waveguide assembly 101 also generates (together with the reflector 301) a standing acoustic wave (e.g., a one dimensional standing wave) in the liquid within the buffer zone between the terminal end 103 of the waveguide assembly and the reflector, with the one or more nodes of the standing wave spaced longitudinally from the outlet port 65, and more particularly from the screen element 66. With particular reference to FIG. 5, as liquid flows up beyond the terminal end 103 of the waveguide assembly 101, it may carry some of the chamber particles 24 into the buffer zone. The acoustic radiation of the standing wave around these particles 24 urges the particles toward the nearest dynamically stable position, which is the node of the one-half wavelength standing wave (or node at each one-half wavelength if the distance between the reflector 301 and waveguide assembly 101 is a multiple of a one-half wavelength). The particles 24 thus become generally "trapped" at the node of the standing wave away from the screen element 66 and outlet port 65 as illustrated in FIG. 5 to thereby inhibit the particles against clogging the screen element, and hence the outlet port, or otherwise reducing the flow rate of liquid out of the chamber 21.

In some embodiments, particles 24 stabilized at the node of the standing wave will agglomerate. As such an agglomeration becomes heavier, the agglomerated particles will fall away from the node and back (e.g., against the direction of flow through the chamber) down into the main bed of particles in the chamber 21.

Where further agitation of the liquid in the chamber 21 is desired, a baffle assemble (not shown) can be disposed within the interior space 53 of the chamber, and in particular generally transversely adjacent the inner surface 67 of the sidewall 57 and in generally transversely opposed relationship with the horn assembly 105. Such a baffle assembly may comprise one or more baffle members disposed adjacent the inner surface 67 of the chamber sidewall 57 and extending at least in part transversely inward from the inner surface of the sidewall toward the horn assembly 105 in interspaced relationship with the agitating members 137. These baffle members facilitate the flow of liquid transversely inward over the ultrasonically vibrated agitating members 137 of the horn assembly 105. One suitable baffle assemble is described more fully in co-pending U.S. application Ser. No. 11/530,311 entitled ULTRASONIC LIQUID TREATMENT CHAMBER AND CONTINUOUS FLOW MIXING SYSTEM and filed Sep. 8, 2006, the disclosure of which is incorporated herein by reference to the extent it is consistent herewith.

In another suitable embodiment, the sidewall 57 of the ultrasonic treatment chamber 21 may be configured and arranged relative to the waveguide assembly 101 to generate a standing acoustic wave therebetween upon ultrasonic vibration of the waveguide assembly. In particular, the chamber sidewall 57 may be constructed of a material having an acoustical impedance that is substantially greater than the liquid flowing within the chamber 21, and in particular along the flow path between the waveguide assembly 101 and the chamber sidewall. The inner surface 67 of the sidewall 57 is suitably spaced from the outer surface 135 of the ultrasonic horn 133 a distance sufficient (based on the liquid in the chamber 21 and the operating frequency of the waveguide assembly 101) to generate a one-half wavelength standing wave wherein the outer surface of the horn acts as a transducer and the sidewall of the chamber acts as a reflector.

Upon operation of the waveguide assembly 101 a standing acoustic wave is produced in the liquid between the horn outer surface 135 and the sidewall inner surface 67. Such a standing wave suitably has at least one node spaced from the sidewall inner surface 67 and the horn outer surface 135. Chamber particles 24 in the flow path are urged toward and generally stabilized or trapped at the one or more nodes of the standing wave to inhibit particles against stagnating against the sidewall 57 and/or against the horn 133, and to inhibit particles against being carried by the flow of liquid downstream beyond the terminal end 103 of the waveguide assembly 101 into the buffer zone.

In other embodiments, such as where the ultrasonic treatment chamber 21 is used for mixing together two or more components to form a liquid solution, it is contemplated that the chamber particles 24 may be omitted (e.g., the chamber would resemble what is illustrated in FIG. 2) without departing from the scope of this invention. In such embodiments, the longitudinal standing wave formed in the buffer zone of the chamber 21 (i.e., by the waveguide assembly 101 and the reflector 301) is used to trap small particulate contaminates that may be present in the liquid components, thus effectively removing the contaminates from the liquid solution before the solution exits the treatment chamber.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An ultrasonic treatment chamber for ultrasonically treating a liquid, said treatment chamber comprising:
    an elongate housing having longitudinally opposite ends and an interior space, the housing being generally closed at said longitudinal ends and having an inlet port for receiving liquid into the interior space of the housing and an outlet port through which liquid is exhausted from the housing following ultrasonic treatment of the liquid, the outlet port being spaced longitudinally from the inlet port such that liquid flows longitudinally within the interior space of the housing from the inlet port to the outlet port,
    an elongate ultrasonic waveguide assembly extending longitudinally within the interior space of the housing and being operable at a predetermined ultrasonic frequency to ultrasonically energize liquid flowing within the housing, the waveguide assembly comprising an elongate ultrasonic horn disposed intermediate the inlet port and the outlet port of the housing and having an outer surface located for contact with liquid flowing within the housing from the inlet port to the outlet port, the waveguide assembly having a terminal end spaced longitudinally from the outlet port of the housing; and
    a standing wave member disposed within the housing longitudinally intermediate the outlet port of the housing and the terminal end of the waveguide assembly, said standing wave member being spaced from the terminal end of the waveguide assembly so as to define an acoustic standing wave therebetween upon operation of the waveguide assembly at said predetermined ultrasonic frequency.

2. The ultrasonic treatment chamber set forth in claim 1 wherein the standing wave member comprises a reflector.

3. The ultrasonic treatment chamber set forth in claim 1 wherein the waveguide assembly further comprises a plurality of discrete agitating members in contact with and extending transversely outward from the outer surface of the horn intermediate the inlet port and the outlet port in longitudinally spaced relationship with each other, the agitating members and the horn being constructed and arranged for dynamic motion of the agitating members relative to the horn upon ultrasonic vibration of the horn at said predetermined frequency and to operate in an ultrasonic cavitation mode of the agitating members corresponding to the predetermined frequency and the liquid being treated in the chamber.

4. The ultrasonic treatment chamber set forth in claim 1 further comprising a bed of particles disposed in the chamber transversely intermediate the waveguide assembly and the chamber housing.

5. The ultrasonic treatment chamber set forth in claim 4 wherein the particles comprise at least one of silica, alumina, titania (titanium dioxide), carbon, mica, copper, iron, nickel, zinc, titanium, corundum (silicon carbide) and ceramic.

6. The ultrasonic treatment chamber set forth in claim 1 wherein the longitudinal position of the standing wave member within the chamber is adjustable relative to the waveguide assembly.

7. The ultrasonic treatment chamber set forth in claim 1 wherein the predetermined frequency is in the range of about 20 kHz to about 40 kHz.

8. The ultrasonic treatment chamber set forth in claim 1 wherein the horn and agitating members together define a horn assembly of the waveguide assembly, the horn assembly being disposed entirely within the interior space of the housing.

9. The ultrasonic treatment chamber set forth in claim 1 further comprising a mounting member for mounting the waveguide assembly on the housing generally at one of said longitudinal ends thereof, the mounting member being constructed to substantially vibrationally isolate the housing from the waveguide assembly.

10. The ultrasonic treatment chamber set forth in claim 1 wherein the horn has a length of approximately one-half wavelength.

11. The ultrasonic treatment chamber set forth in claim 1 wherein the standing wave member is spaced from the terminal end of the waveguide assembly a distance of approximately one-half wavelength.

12. The ultrasonic treatment chamber set forth in claim 1 wherein the housing further comprises a closure at one of said longitudinal ends and having said outlet port therein, said closure having a screen member intermediate the interior of the chamber and the outlet port.

13. An ultrasonic treatment system for ultrasonically treating a liquid, said treatment system comprising:

an elongate, generally tubular housing having longitudinally opposite ends and an interior space, the housing having an inlet for receiving liquid into the interior space of the housing and an outlet through which liquid is exhausted from the housing following ultrasonic treatment of the liquid, the outlet being spaced longitudinally from the inlet such that liquid flows longitudinally within the interior space of the housing from the inlet to the outlet;

an elongate ultrasonic horn extending longitudinally within the interior space of the housing intermediate the inlet and the outlet of the housing; and a drive system operable to ultrasonically vibrate the ultrasonic horn, the ultrasonic treatment system being configured such that operation of the drive system generates mechanical vibration of the horn within the interior space of the housing and further generates a standing acoustic wave within said interior space of the housing.

14. The ultrasonic treatment system set forth in claim 13 further comprising a bed of particles disposed in the chamber transversely intermediate the ultrasonic horn and the housing.

15. The ultrasonic treatment system set forth in claim 14 wherein the particles comprise at least one of silica, alumina, titania (titanium dioxide), carbon, mica, copper, iron, nickel, zinc, titanium, corundum (silicon carbide) and ceramic.

16. The ultrasonic treatment system set forth in claim 13 wherein the standing acoustic wave is directed longitudinally within the interior space of the housing with a node of the standing wave spaced longitudinally from the outlet of said housing.

17. The ultrasonic treatment system set forth in claim 13 further comprising a standing wave member in the interior space of the housing longitudinally intermediate the outlet and the ultrasonic horn whereby the standing acoustic wave is generated between the ultrasonic horn and the standing wave member upon operation of the drive system.

18. The ultrasonic treatment system set forth in claim 17 wherein the standing wave member comprises a reflector.

19. The ultrasonic treatment system set forth in claim 13 wherein the longitudinal position of the standing wave member within the interior space of the housing is adjustable relative to the ultrasonic horn.

20. The ultrasonic treatment system set forth in claim 13 wherein the drive system is operable to vibrate the ultrasonic horn at a frequency in the range of about 20 kHz to about 40 kHz.

21. The ultrasonic treatment system set forth in claim 13 wherein the housing is configured and arranged relative to the ultrasonic horn to generate a standing acoustic wave within said interior space of the housing between said housing and said ultrasonic horn with a node of the standing acoustic wave spaced from both the housing and the ultrasonic horn.

22. The ultrasonic treatment system set forth in claim 13 wherein the ultrasonic horn has a length of approximately one-half wavelength.

23. A process for ultrasonically treating a liquid in an ultrasonic treatment chamber comprised of an elongate, generally tubular housing having an inlet and an outlet spaced longitudinally from the inlet, said process comprising:

directing liquid into the housing at the housing inlet for longitudinal flow within the housing to the housing outlet;

generating mechanical ultrasonic vibration within the housing in direct contact with the liquid flowing within the housing, said direct contact being upstream of the housing outlet; and generating a standing acoustic wave within the housing with the standing acoustic wave having a node spaced longitudinally from the housing outlet.

24. The process set forth in claim 23 further comprising forming a bed of particles in the housing in the flow path of the liquid, the liquid flowing longitudinally through the bed of particles within said housing, subjecting the particles to the mechanical ultrasonic vibration within the housing and trapping some of said particles at the node of the standing acoustic wave within the housing.

* * * * *